(12) United States Patent
Ikeda

(10) Patent No.: US 8,035,699 B2
(45) Date of Patent: Oct. 11, 2011

(54) IMAGE CAPTURING APPARATUS, CONTROL METHOD THEREFOR, AND PROGRAM

(75) Inventor: Yasuyuki Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 361 days.

(21) Appl. No.: 12/366,347

(22) Filed: Feb. 5, 2009

(65) Prior Publication Data
US 2009/0213249 A1    Aug. 27, 2009

(30) Foreign Application Priority Data

Feb. 25, 2008    (JP) ................. 2008-043550

(51) Int. Cl.
*H04N 5/76* (2006.01)

(52) U.S. Cl. ............. 348/231.1; 348/241; 348/231.99; 348/222.1

(58) Field of Classification Search .......... 348/231.1, 348/231.99, 222.1, 241
See application file for complete search history.

(56) References Cited

U.S. PATENT DOCUMENTS

| | | | |
|---|---|---|---|
| 7,778,542 B2 * | 8/2010 | Oshima | 396/236 |
| 7,893,984 B2 * | 2/2011 | Ikeda | 348/333.12 |
| 2007/0195185 A1 * | 8/2007 | Onuki | 348/333.02 |
| 2008/0158406 A1 | 7/2008 | Ito | |
| 2009/0153709 A1 * | 6/2009 | Kanzaki et al. | 348/294 |

FOREIGN PATENT DOCUMENTS

| | | |
|---|---|---|
| JP | 06-105241 | 4/1994 |
| JP | 2001-223894 | 8/2001 |
| JP | 2004-242158 | 8/2004 |
| JP | 2005192115 A * | 7/2005 |

* cited by examiner

*Primary Examiner* — David Ometz
*Assistant Examiner* — Antoinette Spinks
(74) *Attorney, Agent, or Firm* — Cowan, Liebowitz & Latman, P.C.

(57) ABSTRACT

An image capturing apparatus comprises an image capturing unit which has an image sensor, a storage unit which stores foreign substance information of a foreign substance adhering to an optical element arranged in front of the image sensor, a buffer unit which temporarily stores the image signal output from the image capturing unit, a correction unit which corrects, based on the foreign substance information, an image signal corresponding to a shadow of the foreign substance among image signals output from the buffer unit and outputs a corrected image signal, and a control unit which controls the buffer unit and the correction unit to change, in accordance with a free area of the buffer unit, an amount of the image signal corresponding to the shadow of the foreign substance that is to be corrected among image signals output from the image capturing unit.

8 Claims, 15 Drawing Sheets

| PARAMETERS | SETTINGS |
|---|---|
| APERTURE VALUE | F22 |
| ISO | 400 |
| SHUTTER SPEED | 1 / 30 |
| PHOTOMETRY MODE | AVERAGE PHOTOMETRY |
| ELECTRONIC FLASH | INHIBITED |
| EXPOSURE COMPENSATION | INHIBITED |
| AF MODE | MANUAL |

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>    X-COORDINATE OF CENTER (2 BYTES)<br>    Y-COORDINATE OF CENTER (2 BYTES) |
| | | PARAMETERS OF DUST REGION $D_2$ |
| | | . . . |
| | | PARAMETERS OF DUST REGION $D_n$ |

IMAGE CAPTURING APPARATUS, CONTROL METHOD THEREFOR, AND PROGRAM

BACKGROUND OF THE INVENTION

1. Field of the Invention

The present invention relates to a technique of suppressing degradation of image quality caused by a foreign substance adhering to the surface of an optical low-pass filter or the like arranged in front of an image sensor such as a CCD or CMOS sensor in an image capturing apparatus and, more particularly, to a technique of suppressing degradation of image quality caused by a foreign substance when recording a moving image.

2. Description of the Related Art

When the lens is detached from the camera body of a lens-interchangeable digital camera, mote floating in air may enter the camera body. The camera incorporates various mechanical units such as a shutter mechanism which mechanically operate. When these mechanical units operate, dust such as metal powder may be generated in the camera body.

When a foreign substance such as dust or mote adheres to the surface of an optical low-pass filter which is an optical element arranged in front of an image sensor and forms the image capturing unit of the digital camera, the shadow of the foreign substance is included in a captured image, degrading the image quality.

A camera using a silver halide film feeds the film in every shooting. Hence, images never contain the same foreign substance at the same position continuously. However, the digital camera requires no operation of feeding the film frame in every shooting, and therefore, captured images continuously contain the same foreign substance at the same position.

To solve this problem, there is proposed a method of correcting a pixel capturing the image of a foreign substance by using the signals of neighboring pixels or the like. As a technique of correcting such a pixel, for example, Japanese Patent Laid-Open No. 6-105241 proposes a pixel defect correction method of correcting the pixel defect of an image sensor. Japanese Patent Laid-Open No. 2004-242158 proposes a method of changing the extension or the like of an image file recorded in a dust acquisition mode from that of a normal image in order to simplify setting of position information of a pixel defect. According to this method, a PC (Personal Computer) automatically determines a dust information image, and corrects a target image using the information.

Recently, a technique of handling moving image information as digital data, and encoding it at high compression ratio with high image quality to accumulate and transmit the encoded data has been proposed and become popular.

Motion JPEG (Joint Photographic Experts Group) encodes a moving image by applying still image encoding (e.g., JPEG encoding) to each frame. Although JPEG encoding basically targets still images, products which apply JPEG encoding to even moving images by high-speed processing have come into practical use.

An outline of JPEG encoding will be explained briefly. Image data is divided into blocks of a predetermined size (e.g., blocks each having 8×8 pixels). Each block undergoes 2D discrete cosine transform, and the transform coefficient is quantized linearly or non-linearly. The quantized transform coefficient undergoes Huffman coding (variable length coding). More specifically, the difference value between the DC component of the transform coefficient and that of a neighboring block is Huffman-coded. The AC component is converted from a low-frequency component to a high-frequency serial component by zig-zag scanning. A set of an invalid component "0" run and a subsequent valid component run is Huffman-coded.

An encoding method aiming at higher compression ratios and higher image qualities is H.264 (MPEG4-Part10 AVC). It is known that H.264 requires larger calculation amounts for encoding and decoding than those in conventional encoding methods such as MPEG2 and MPEG4, but can achieve higher coding efficiencies (see ISO/IEC 14496-10, "Advanced Video Coding").

FIG. 16 is a diagram showing the arrangement of an image processing apparatus which compresses image data by H.264. In FIG. 16, input image data is divided into macroblocks, which are sent to a subtracter 401. The subtracter 401 calculates the difference between image data and a predicted value, and outputs it to an integer DCT (Discrete Cosine Transform) transform unit 402. The integer DCT transform unit 402 executes integer DCT transform for the input data, and outputs the transformed data to a quantization unit 403. The quantization unit 403 quantizes the input data. The quantized data is sent as difference image data to an entropy encoder 415, while it is inversely quantized by an inverse quantization unit 404, and undergoes inverse integer DCT transform by an inverse integer DCT transform unit 405. An adder 406 adds a predicted value to the inversely transformed data, reconstructing an image.

The reconstructed image is sent to a frame memory 407 for intra (intra-frame) prediction, while it undergoes deblocking filter processing by a deblocking filter 409, and then is sent to a frame memory 410 for inter (inter-frame) prediction. The image in the intra prediction frame memory 407 is used for intra prediction by an intra prediction unit 408. The intra prediction uses the value of a pixel adjacent to an encoded block as a predicted value.

The image in the inter prediction frame memory 410 is formed from a plurality of pictures, as will be described later. A plurality of pictures are classified into two lists "List0" and "List1". A plurality of pictures classified into the two lists are used for inter prediction by an inter prediction unit 411. After the inter prediction, a memory controller 413 updates internal images. In the inter prediction by the inter prediction unit 411, a predicted image is determined using an optimal motion vector based on the result of motion detection between image data of different frames by a motion detection unit 412.

As a result of intra prediction and inter prediction, a selector 414 selects an optimal prediction result. The motion vector is sent to the entropy encoder 415, and encoded together with the difference image data, forming an output bit stream.

H.264 inter prediction will be explained in detail with reference to FIGS. 17 to 20.

The H.264 inter prediction can use a plurality of pictures for prediction. Hence, two lists ("List0" and "List1") are prepared to specify a reference picture. A maximum of five reference pictures can be assigned to each list.

P-pictures use only "List0" to mainly perform forward prediction. B-pictures use "List0" and "List1" to perform bidirectional prediction (or only forward or backward prediction). That is, "List0" holds pictures mainly for forward prediction, and "List1" holds pictures mainly for backward prediction.

FIG. 17 shows an example of a reference list used in encoding. This example assumes that the ratio of I-, P-, and B-pictures is a standard one, that is, I-pictures are arranged at an interval of 15 frames, P-pictures are arranged at an interval of three frames, and B-pictures between I- and P-pictures are arranged at an interval of two frames. In FIG. 17, image data 1001 is obtained by arranging pictures in the display order. Each square in the image data 1001 describes the type of picture and a number representing the display order. For example, a picture I15 is an I-picture whose display order is 15, and is used for only intra prediction. A picture P18 is a P-picture whose display order is 18, and is used for only forward prediction. A picture B16 is a B-picture whose display order is 16, and is used for bidirectional prediction.

The encoding order is different from the display order, and data are encoded in the prediction order. In FIG. 17, data are encoded in the order of "I15, P18, B16, B17, P21, B19, B20, . . . "

In FIG. 17, a reference list (List0) 1002 holds temporarily encoded/decoded pictures. For example, inter prediction using a picture P21 (P-picture whose display order is 21) refers to pictures which have been encoded and decoded in the reference list (List0) 1002. In the example shown in FIG. 17, the reference list 1002 holds pictures P06, P09, P12, I15, and P18.

In inter prediction, a motion vector having an optimal predicted value is obtained for each macroblock from reference pictures in the reference list (List0) 1002, and encoded. Pictures in the reference list (List0) 1002 are sequentially given reference picture numbers, and discriminated (separately from numbers shown in FIG. 17).

After the end of encoding the picture P21, the picture P21 is newly decoded and added to the reference list (List0) 1002. The oldest reference picture (in this case, the picture P06) is deleted from the reference list (List0) 1002. Encoding proceeds in the order of pictures B19, B20, and P24. FIG. 18 shows the state of the reference list (List0) 1002 at this time.

FIG. 19 shows a change of the reference list for each picture.

In FIG. 19, pictures are coded sequentially from the top. FIG. 19 shows a picture during encoding and the contents of the reference lists (List0 and List1) for it. When a P-picture (or I-picture) is encoded as shown in FIG. 19, the reference lists (List0 and List1) are updated to delete the oldest pictures from the reference lists (List0 and List1). In this example, the reference list (List1) holds only one picture. This is because, if the number of pictures referred to for backward prediction increases, the buffer amount until decoding also increases. In other words, backward pictures excessively distant from a picture during encoding are not referred to.

In this example, I- and P-pictures are referred to, and all I- and P-pictures are sequentially added to the reference lists (List0 and List1). Only I-pictures are used in the reference list (List1) for backward prediction because this picture arrangement is considered to be the most popular one. However, the picture arrangement in the reference list is merely an example of the most popular one, and H.264 itself has a high degree of freedom for the configuration of the reference list.

For example, not all I- and P-pictures need be added to the reference list, and B-pictures can also be added to the reference list. Also, H.264 defines a long-term reference list of pictures which stay in the reference list until an explicit instruction is received. FIG. 20 shows a change of the reference list when adding B-pictures to the reference list. When adding B-pictures to the reference list, encoded pictures may be added to the reference list every time all B-pictures are coded.

Compact digital cameras capable of recording a moving image using these encoding methods have also been developed and commercialized. The user can easily view an image using such a digital camera, a personal computer, a DVD player, or the like.

In this situation, it is needed more and more recently to record higher-resolution moving images with a larger number of pixels not only by a compact digital camera but also by a lens-interchangeable digital camera. However, as described above, dust adheres to the surface of an image sensor owing to a variety of factors in the lens-interchangeable digital camera. If a moving image is recorded while dust adheres to the surface of the image sensor, the dust image may always appear at the same position during playback of the moving image.

According to a conventional dust removal method in a lens-interchangeable digital camera, information (e.g., information on the position and size of dust) necessary for dust removal and image data are recorded. An image is loaded later into a personal computer or the like to remove a dust image by image processing. That is, a dust image is captured in recorded image data. As for a still image, dust removal is executed for each still image. To the contrary, as for a moving image, dust removal must be done for all the recording time and is a time-consuming work.

In still image shooting, even when the camera internally executes dust removal, the dust removal processing takes a long time, and when the buffer memory in the camera becomes full, shooting can be temporarily interrupted. However, in moving image recording, image data must be successively captured, so shooting cannot be temporarily interrupted.

SUMMARY OF THE INVENTION

The present invention has been made to overcome the conventional drawbacks, and has as its object to perform dust removal processing in moving image recording without interrupting moving image recording.

To solve the above-described problems and achieve the object, according to the first aspect of the present invention, there is provided an image capturing apparatus comprising an image capturing unit which has an image sensor for photoelectrically converting an object image, and generates an image signal on the basis of an output signal from the image sensor, a storage unit which stores foreign substance information including information on at least a position and size of a foreign substance adhering to an optical element arranged in front of the image sensor, a buffer unit which temporarily stores the image signal output from the image capturing unit, a correction unit which corrects, based on the foreign substance information, an image signal corresponding to a shadow of the foreign substance among image signals output from the buffer unit and outputs a corrected image signal, and a control unit which controls the buffer unit and the correction unit to change, in accordance with a free area of the buffer unit, an amount of the image signal corresponding to the shadow of the foreign substance that is to be corrected among image signals output from the image capturing unit.

According to the second aspect of the present invention, there is also provided a method of controlling an image capturing apparatus including an image capturing unit which has an image sensor for photoelectrically converting an object image, and generates an image signal on the basis of an output signal from the image sensor, a storage unit which stores foreign substance information including information on at least a position and size of a foreign substance adhering to an optical element arranged in front of the image sensor, a buffer unit which temporarily stores the image signal output from the image capturing unit, and a correction unit which corrects, based on the foreign substance information, an image signal corresponding to a shadow of the foreign substance among image signals output from the buffer unit and outputs a corrected image signal, the method comprising a control step of controlling the buffer unit and the correction unit to change, in accordance with a free area of the buffer unit, an amount of the image signal corresponding to the shadow of the foreign substance that is to be corrected among image signals output from the image capturing unit.

Further features of the present invention will become apparent from the following description of exemplary embodiments with reference to the attached drawings.

BRIEF DESCRIPTION OF THE DRAWINGS

FIG. 5 is a view showing the structure of a dust information profile;

DESCRIPTION OF THE EMBODIMENTS

Preferred embodiments of the present invention will now be described in detail with reference to the accompanying drawings.

Figure 1:
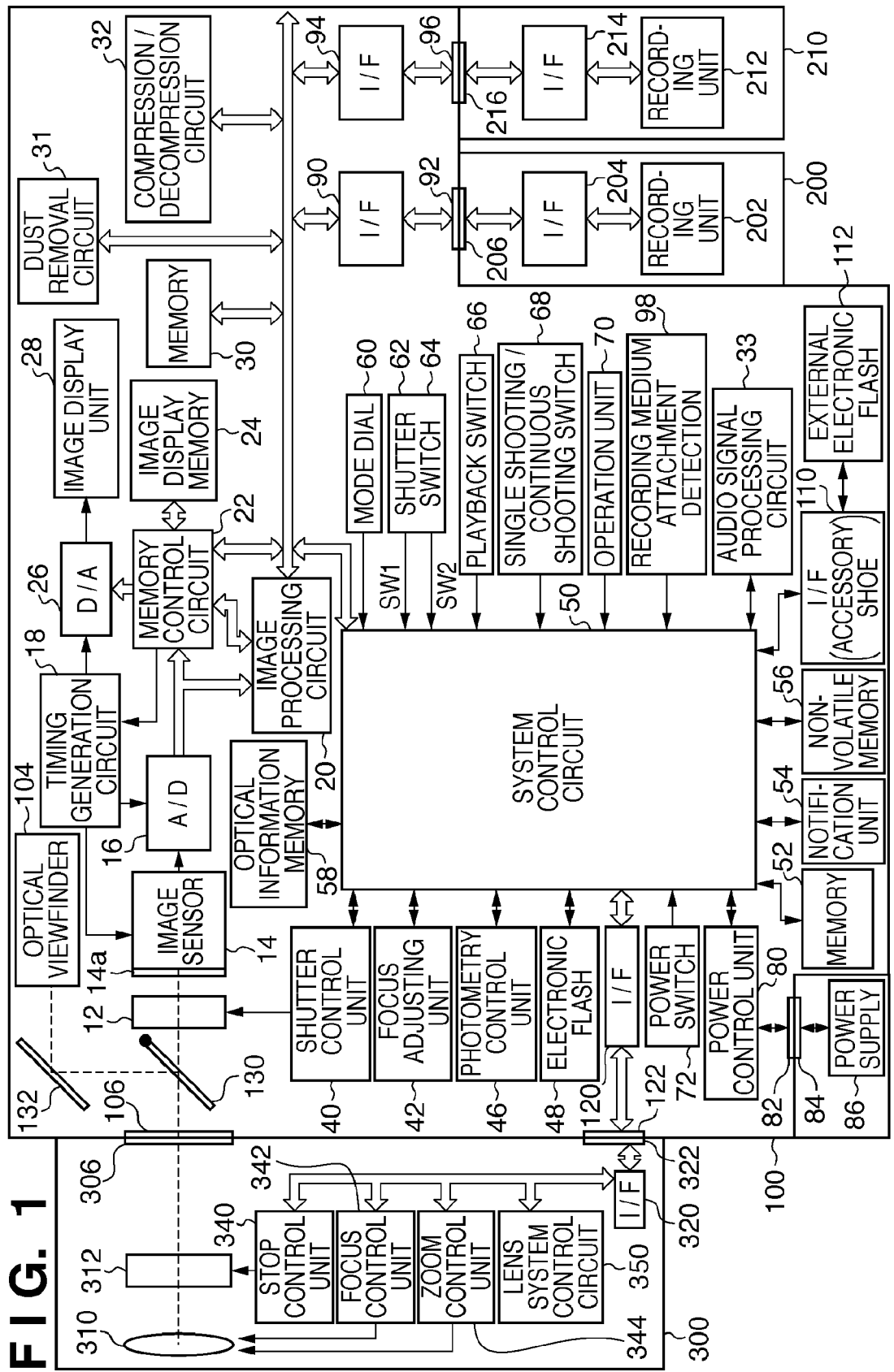
FIG. 1 is a block diagram showing the arrangement of an image capturing apparatus having an image processing function in an embodiment of the present invention.

FIG. 1 is a block diagram showing the arrangement of an image capturing apparatus having an image processing function in an embodiment of the present invention. In the embodiment, a lens-interchangeable single-lens reflex digital still camera will be exemplified as the image capturing apparatus. The present invention is also applicable to, for example, a lens-interchangeable digital video camera as the image capturing apparatus.

As shown in FIG. 1, the image capturing apparatus according to the embodiment mainly includes a camera body 100 and an interchangeable-lens type lens unit 300.

The lens unit 300 includes an imaging lens 310 formed from a plurality of lenses, a stop 312, and a lens mount 306 which mechanically connects the lens unit 300 to the camera body 100. The lens mount 306 incorporates various functions for electrically connecting the lens unit 300 to the camera body 100. In the lens mount 306, an interface 320 connects the lens unit 300 to the camera body 100. A connector 322 electrically connects the lens unit 300 to the camera body 100.

The connector 322 also has a function of exchanging control signals, state signals, and data signals between the camera body 100 and the lens unit 300 and also receiving currents of various voltages. The connector 322 may also communicate not only by telecommunication but also by optical communication or speech communication.

A stop control unit 340 controls the stop 312 in cooperation with a shutter control unit 40 (to be described later) which controls a shutter 12 of the camera body 100 on the basis of photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information such as a number unique to the lens unit 300, management information, functional information such as the open and minimum aperture values and a focal length, and current and past set values.

The arrangement of the camera body 100 will be described next.

A lens mount 106 mechanically connects the camera body 100 to the lens unit 300. Mirrors 130 and 132 guide a light beam that has entered the imaging lens 310 to an optical viewfinder 104 by the single-lens reflex method. The mirror 130 can be either a quick return mirror or a half mirror. Reference numeral 12 denotes a focal plane shutter. An image sensor 14 is formed from a CCD sensor, CMOS sensor, or the like, and photoelectrically converts an object image. An optical element 14a such as an optical low-pass filter is arranged in front of the image sensor 14. A foreign substance such as dust adhering to the surface of the optical element 14a is captured in an image generated by the image sensor 14, degrading the image quality. The embodiment is directed to a technique of suppressing the degradation of image quality.

The light beam that has entered the imaging lens 310 is guided via the stop 312 serving as a light quantity restriction means, the lens mounts 306 and 106, the mirror 130, and the shutter 12 by the single-lens reflex method and forms an optical image on the image sensor 14.

An A/D converter 16 converts an analog signal (output signal) output from the image sensor 14 into a digital signal. A timing generation circuit 18 supplies clock signals and control signals to the image sensor 14, the A/D converter 16, and a D/A converter 26. The timing generation circuit 18 is controlled by a memory control circuit 22 and system control circuit 50.

An image processing circuit 20 executes predetermined pixel interpolation processing or color conversion processing for data from the A/D converter 16 or data from the memory control circuit 22. The image processing circuit 20 also performs predetermined arithmetic processing using image data output from the A/D converter 16, as needed. Based on the obtained arithmetic result, the system control circuit 50 can execute auto-focus (AF) processing, auto-exposure (AE) processing, and pre-electronic flash (EF) processing of TTL (Through The Lens) scheme to control the shutter control unit 40 and a focus adjusting unit 42. The image processing unit 20 also executes predetermined arithmetic processing using image data output from the A/D converter 16 and also performs automatic white balance (AWB) processing by TTL scheme based on the obtained arithmetic result.

In the example shown in FIG. 1 in the embodiment, the focus adjusting unit 42 and photometry control unit 46 are provided for exclusive use. Hence, AF processing, AE processing, and EF processing may also be performed using not the image processing circuit 20 but the focus adjusting unit 42 and photometry control unit 46. Alternatively, AF processing, AE processing, and EF processing may also be performed first by using the focus adjusting unit 42 and photometry control unit 46 and then by using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as an LCD of TTL scheme via the D/A converter 26. The image display unit 28 sequentially displays captured image data, thereby implementing an electronic viewfinder (EVF) function. The image display unit 28 can arbitrarily turn on/off its display in accordance with an instruction from the system control circuit 50. When display is OFF, the power consumption of the camera body 100 can greatly be reduced.

The memory 30 is used to store sensed still images or moving images and has a memory capacity enough to store a predetermined number of still images or a predetermined amount of moving image. Hence, even in continuous shooting or panoramic shooting for continuously sensing a plurality of still images, it is possible to write an enormous amount of image data in the memory 30 at high speed. The memory 30 is used as a frame buffer for successively writing images at a predetermined rate. The memory 30 is also usable as the work area of the system control circuit 50.

A dust removal circuit 31 removes a dust image included in image data by image processing using dust information stored in a nonvolatile memory 56 (to be described later) and optical information obtained from the lens unit 300.

Figure 16:
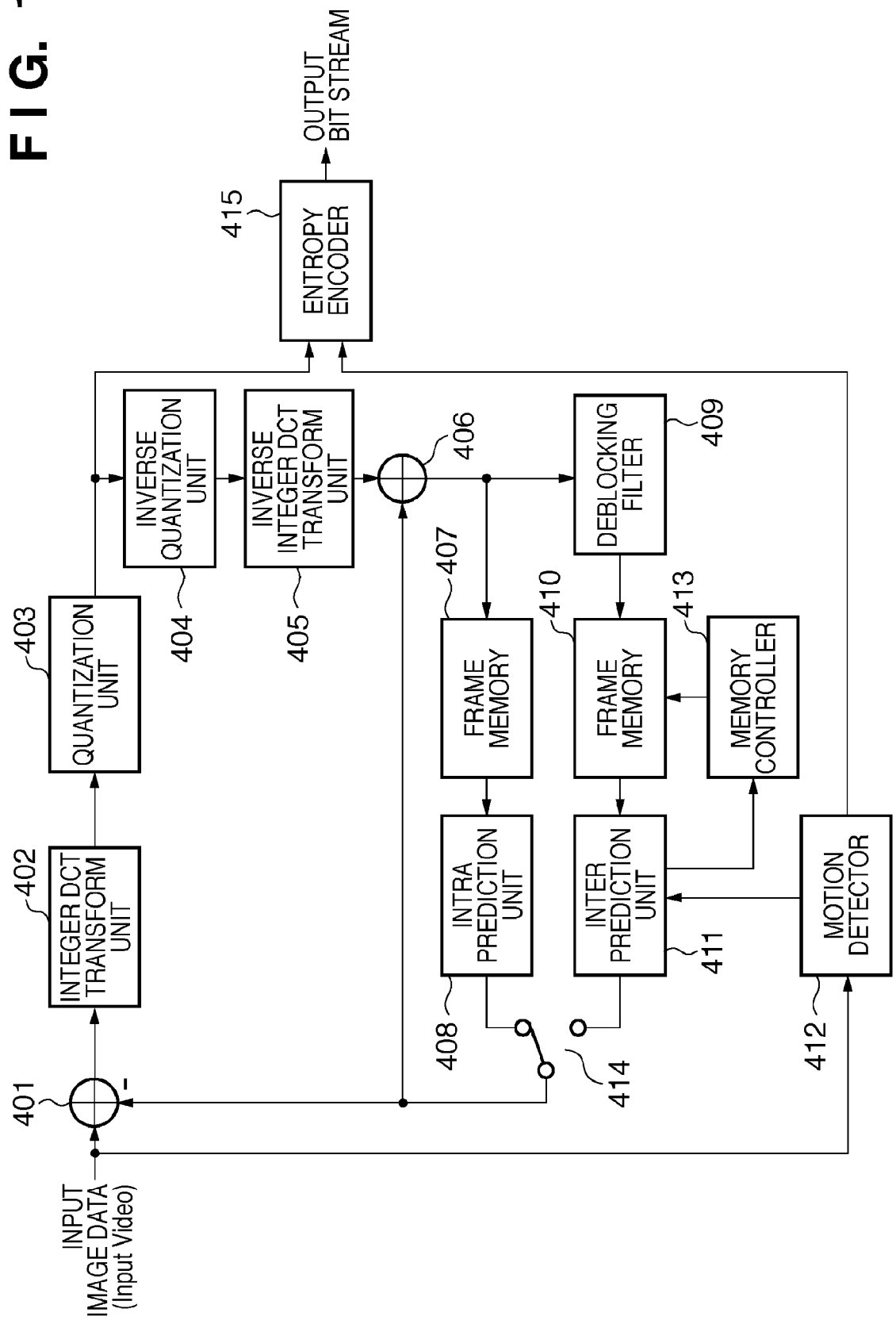
FIG. 16 is a diagram showing the arrangement of an image processing apparatus which compresses image data by H.264.
Figure 17:
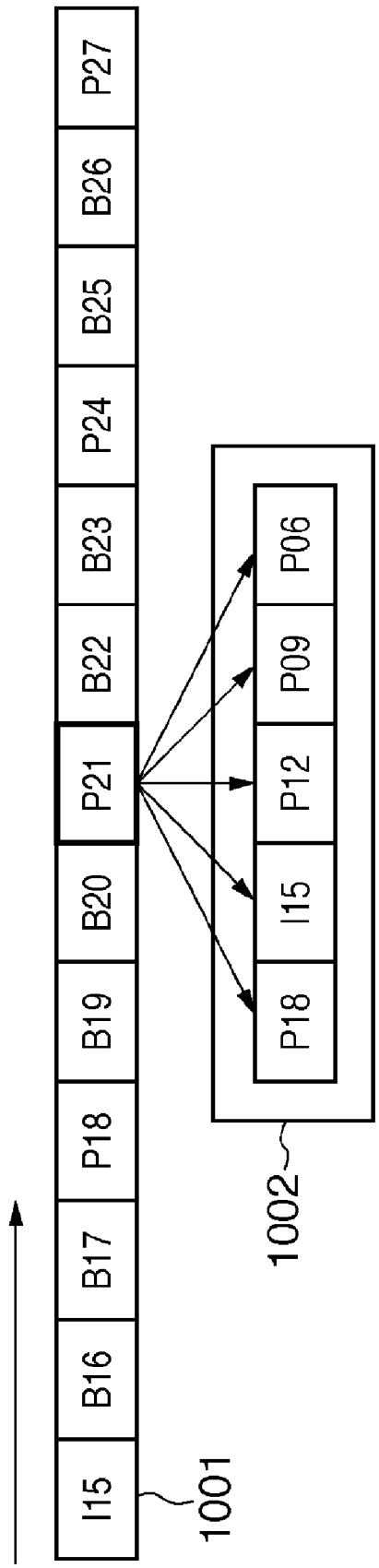
FIG. 17 is a view showing an example of a reference list when encoding a picture P21.
Figure 18:
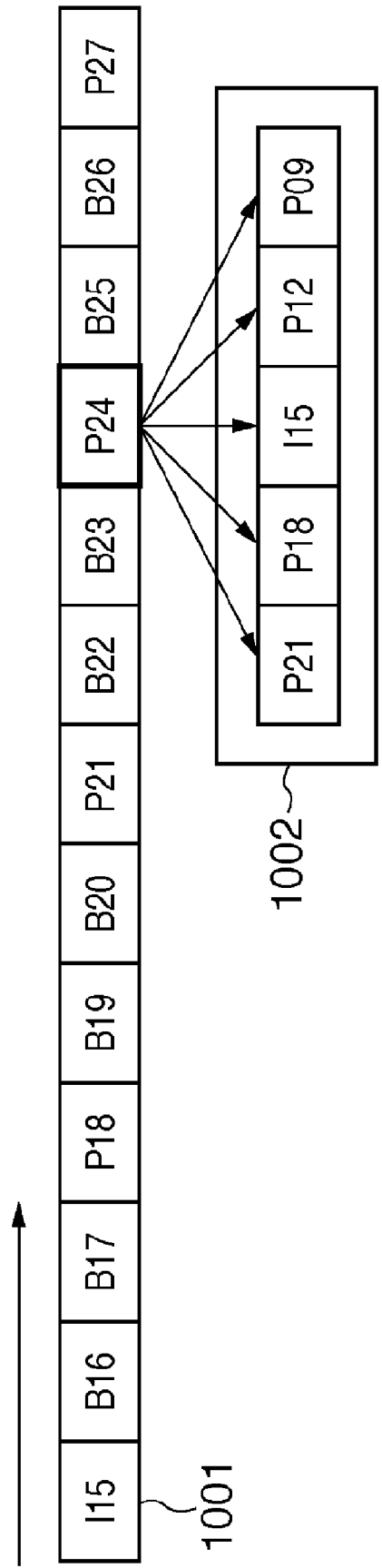
FIG. 18 is a view showing an example of a reference list when encoding a picture P24.
Figure 19:
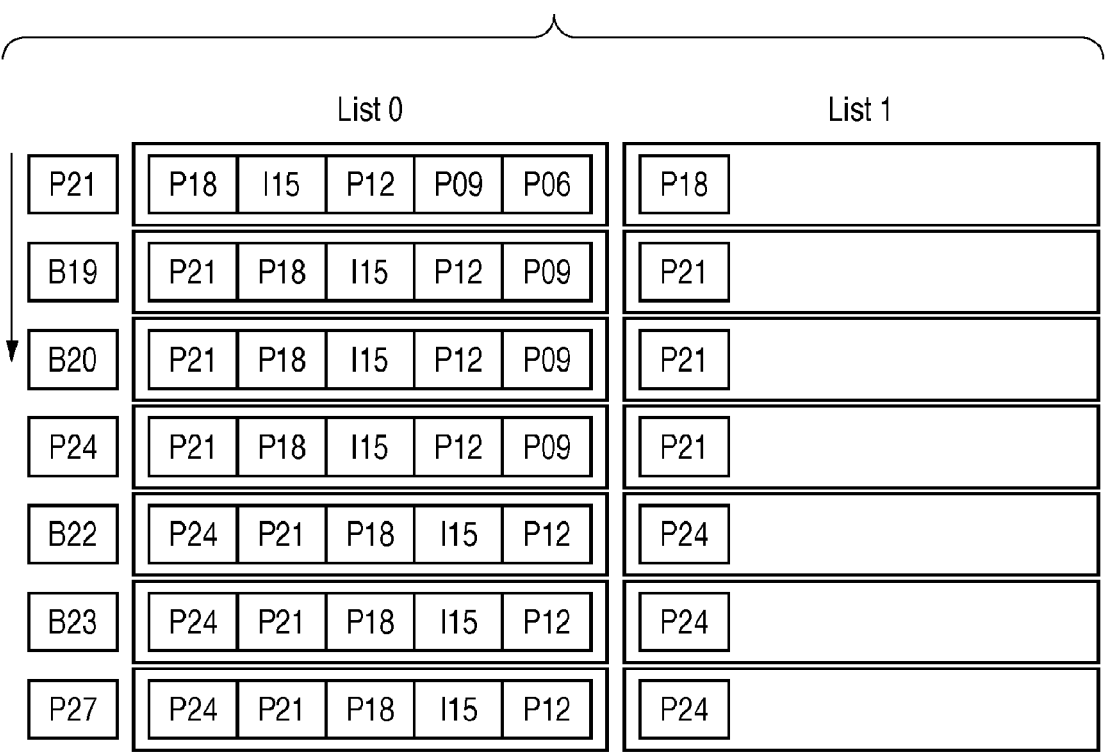
FIG. 19 is a view showing a change of the reference list for each picture.
Figure 20:
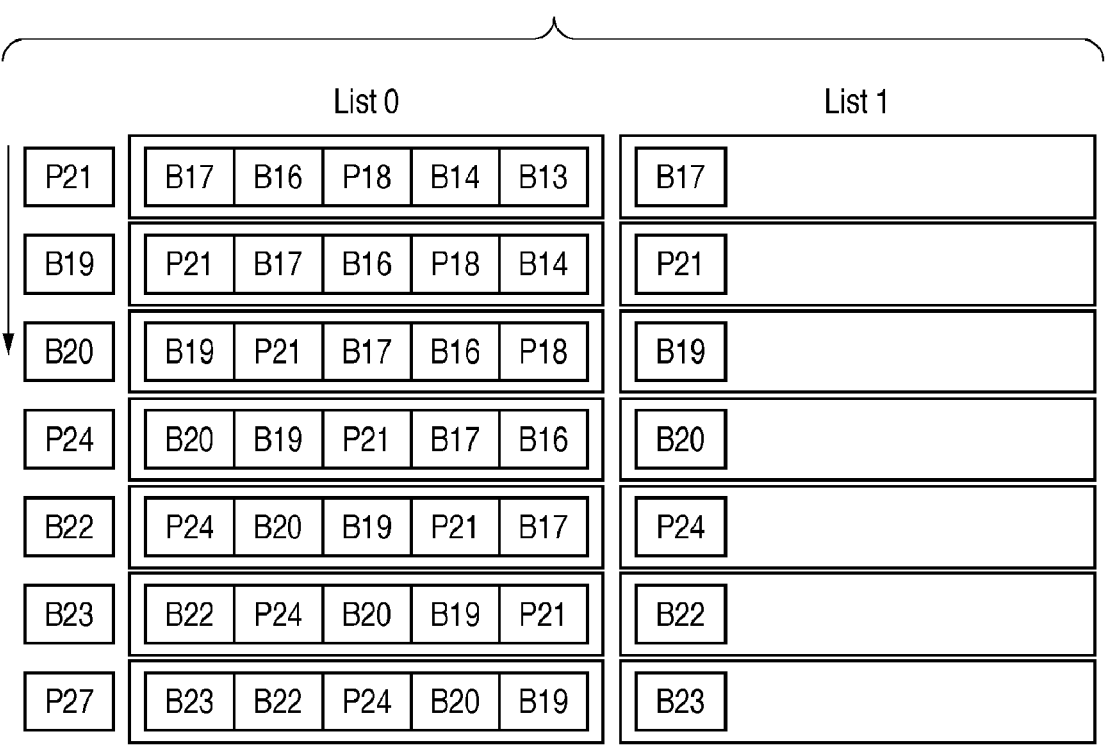
FIG. 20 is a view showing a change of the reference list when adding B-pictures to the reference list.

The compression/decompression circuit 32 compresses/decompresses image data using a known compression method. The compression/decompression circuit 32 reads out an image from the memory 30, compresses or decompresses it, and writes the processed data in the memory 30 again. The compression/decompression circuit 32 also has a function of compression-encoding moving image data into a predetermined format, or decompressing predetermined compression-encoded data into a moving image signal. More specifically, when the compression/decompression circuit 32 complies with H.264, it has the functions of the respective blocks shown in FIG. 16.

An audio signal processing circuit 33 has a function of encoding an audio signal input from a microphone (not shown) into a predetermined encoding format, and decoding predetermined encoded data into an audio signal. The digital camera in the embodiment has a function of outputting audio data decoded by the audio signal processing circuit 33 from a loudspeaker (not shown).

The shutter control unit 40 controls the shutter 12 in cooperation with the stop control unit 340 that controls the stop 312 on the basis of photometry information from the photometry control unit 46. The focus adjusting unit 42 executes AF (auto-focus) processing. A light beam that has entered the imaging lens 310 of the lens unit 300 is guided via the stop 312, lens mounts 306 and 106, mirror 130, and a focus adjusting sub-mirror (not shown) by the single-lens reflex method, thereby detecting the focus state of an image formed as an optical image.

The photometry control unit 46 executes AE (auto-exposure) processing. A light beam that has entered the imaging lens 310 of the lens unit 300 is guided via the stop 312, lens mounts 306 and 106, mirror 130, and a photometry sub-mirror (not shown) by the single-lens reflex method, thereby measuring the exposure state of an image formed as an optical image. An electronic flash 48 has an AF auxiliary light projecting function and an electronic flash control function. The photometry control unit 46 also has an EF (electronic flash control) processing function in cooperation with the electronic flash 48.

AF control may also be done using the measurement result of the focus adjusting unit 42 and the arithmetic result obtained by causing the image processing circuit 20 to arithmetically process image data from the A/D converter 16. Exposure control may also be done using the measurement result of the photometry control unit 46 and the arithmetic result obtained by causing the image processing circuit 20 to arithmetically process image data from the A/D converter 16.

The system control circuit 50 controls the overall camera body 100 and incorporates a known CPU. A memory 52 stores constants, variables, and programs for the operation of the system control circuit 50.

A notification unit 54 notifies the outside of operation states and messages using a text, image, and sound in accordance with program execution by the system control circuit 50. As the notification unit 54, a display unit such as an LCD or LED for visual display and a sound generation element for generating a notification by sound are used. The notification unit 54 includes one of them or a combination of two or more of them. Particularly, a display unit is arranged at a single visible position or a plurality of visible positions near an operation unit 70 of the camera body 100. Some functions of the notification unit 54 are arranged in the optical viewfinder 104.

The display contents of the image display unit 28 such as an LCD among those of the notification unit 54 include display associated with shooting modes such as single shooting/continuous shooting and self timer, display associated with recording such as a compression ratio, number of recording pixels, number of recorded images, number of recordable images, and display associated with shooting conditions such as a shutter speed, aperture value, exposure compensation, brightness compensation, external flash light emission amount, and red eye mitigation. The image display unit 28 also displays macro shooting, buzzer setting, battery level, error message, information by a plurality of digits, and the attached/detached states of a recording medium 200 and PC 210. The image display unit 28 also displays the attached/detached state of the lens unit 300, communication I/F operation, date and time, and the connection state of an external computer.

Some of the display contents of the notification unit 54 are indicated in the optical viewfinder 104, which include, for example, in-focus, ready for shooting, camera shake warning, flash charge, flash charge completion, shutter speed, aperture value, exposure compensation, and recording medium write operation.

The nonvolatile memory 56 is an electrically erasable programmable memory such as an EEPROM and stores programs (to be described later) and the like.

An optical information memory 58 stores various kinds of lens information (to be described later) obtained from the lens unit 300 via a connector 122.

Reference numerals 60, 62, 64, 66, 68, and 70 denote operation means for inputting various kinds of operation instructions of the system control circuit 50. They include a single component or a combination of a plurality of switches, dials, touch panel, pointing by line-of-sight detection, and voice recognition device.

The operation means will be described here in detail.

The mode dial switch 60 can selectively set a shooting mode such as an automatic shooting mode, programmed shooting mode, shutter speed priority shooting mode, stop priority shooting mode, manual shooting mode, or focal depth priority (depth) shooting mode. The mode dial switch 60 can also selectively set a shooting mode such as a portrait shooting mode, landscape shooting mode, closeup shooting mode, sports shooting mode, nightscape shooting mode, and panoramic shooting mode.

The shutter switch SW1 62 is turned on by operating a shutter button (not shown) halfway (e.g., half stroke) to designate the start of an operation such as AF processing, AE processing, AWB processing, or EF processing.

The shutter switch SW2 64 is turned on by operating the shutter button (not shown) completely (e.g., full stroke) to designate the start of a series of shooting processes including exposure processing, development processing, and recording processing. In the exposure processing, a signal read out from the image sensor 14 is written in the memory 30 via the A/D converter 16 and memory control circuit 22. Then, the development processing is done using calculation by the image processing circuit 20 or memory control circuit 22. In the recording processing, image data is read out from the memory 30, compressed by the compression/decompression circuit 32, and written in or transmitted to the recording medium 200 or PC 210.

The playback switch 66 designates the start of a playback operation of reading out an image sensed in a shooting mode from the memory 30, recording medium 200, or PC 210 and displaying it on the image display unit 28. The playback switch 66 can set another functional mode such as a playback mode, multiwindow playback/erase mode, or PC-connected mode.

The single shooting/continuous shooting switch 68 can set a single shooting mode in which shooting of one frame is performed when the user presses the shutter switch SW2 64, and then a standby state is set, or a continuous shooting mode in which shooting is continuously performed while the user is pressing the shutter switch SW2 64.

The operation unit 70 includes various buttons and a touch panel. Examples of the buttons are a live view start/stop button, moving image recording start/stop button, menu button, setting button, multiwindow playback/page break button, flash setting button, single shooting/continuous shooting/self timer switch button, menu move plus (+) button, and menu move minus (−) button. The operation unit 70 further includes a playback image move plus (+) button, playback image move minus (−) button, shooting image quality select button, exposure compensation button, brightness compensation button, external flash light emission amount setting button, and date/time setting button. The numerical values or functions of the plus and minus buttons can more easily be selected using a rotary dial switch.

The operation unit 70 also has an image display ON/OFF switch which turns on/off the image display unit 28, and a quick review ON/OFF switch which sets a quick review function of automatically playing back sensed image data immediately after shooting. The operation unit 70 also has a compression mode switch which selects a compression ratio for JPEG compression, or a RAW mode for directly digitizing a signal from the image sensor and recording it on a recording medium. The operation unit 70 also has an AF mode setting switch capable of setting a one-shot AF mode or a servo AF mode. In the one-shot AF mode, the auto-focus operation starts when the user presses the shutter switch SW1 62. Once an in-focus state is obtained, this state is continuously held. In the servo AF mode, the auto-focus operation is continuously performed while the user is pressing the shutter switch SW1 62. The operation unit 70 also includes a setting switch capable of setting a dust information acquisition mode to sense a dust detection image and acquire dust information, as will be described later.

A power switch 72 can selectively set the power ON or power OFF mode of the camera body 100. The power switch 72 can also selectively set the power ON or power OFF mode of each of various accessories including the lens unit 300, an external electronic flash 112, the recording medium 200, and the PC 210 connected to the camera body 100.

A power supply control unit 80 includes a cell detection circuit, DC/DC converter, and switching circuit for switching the block to be energized. The power supply control unit 80 detects the presence/absence of attachment of a cell, the type of cell, and the battery level, controls the DC/DC converter based on the detection result and an instruction from the system control circuit 50, and supplies a necessary voltage to the units including a recording medium for a necessary period.

Reference numerals 82 and 84 denote connectors; and 86, a power supply unit formed from a primary cell such as an alkaline cell or lithium cell, a secondary cell such as an NiCd cell, NiMH cell, Li-ion cell, or Li-polymer cell, or an AC adapter.

Reference numerals 90 and 94 denote interfaces with a PC or a recording medium such as a memory card or hard disk; and 92 and 96, connectors to connect a PC or a recording medium such as a memory card or hard disk. A recording medium attachment detection circuit 98 detects whether the recording medium 200 or PC 210 is attached or connected to the connectors 92 and/or 96.

In the embodiment, there are two systems of interfaces and connectors to connect a recording medium. The interfaces and connectors to connect a recording medium can have either one or a plurality of systems. Interfaces and connectors of different standards may also be combined.

Interfaces and connectors based on various storage medium standards are usable. Examples are a PCMCIA (Personal Computer Memory Card International Association) card, CF (CompactFlash®) card, and SD card. When the interfaces 90 and 94 and the connectors 92 and 96 are based on the standard of the PCMCIA card or CF® card, various kinds of communication cards are connectable. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also usable. It is possible to transfer image data and management information associated with it to another computer or a peripheral device such as a printer by connecting the various kinds of communication cards.

The optical viewfinder 104 can display an optical image formed by a light beam which enters the imaging lens 310 and is guided via the stop 312, lens mounts 306 and 106, and mirrors 130 and 132 by the single-lens reflex method. It is therefore possible to perform shooting using not the electronic viewfinder function of the image display unit 28 but only the optical viewfinder. Some of the functions of the notification unit 54 such as an in-focus state, camera shake warning, flash charge, shutter speed, aperture value, and exposure compensation are displayed in the optical viewfinder 104.

The external electronic flash 112 is attached via an accessory shoe 110.

An interface 120 connects the camera body 100 to the lens unit 300 in the lens mount 106.

The connector 122 electrically connects the camera body 100 to the lens unit 300. A lens attachment detection unit (not shown) detects whether the lens unit 300 is attached to the lens mount 106 and connector 122. The connector 122 also has a function of transmitting control signals, state signals, data signals, and the like between the camera body 100 and the lens unit 300 and also supplying currents of various voltages.

Various kinds of optical information (e.g., aperture value, zoom position, pupil distance, and focal length) of the lens unit 300 which are communicated via the connector 122 are stored in the optical information memory 58 of the camera body 100. The communication of the information is sometimes requested by the camera, or the information is communicated from the lens every time it is updated.

The connector 122 may also communicate not only by telecommunication but also by optical communication or speech communication.

The recording medium 200 is a memory card or hard disk. The recording medium 200 includes a recording unit 202 formed from a semiconductor memory or magnetic disk, an interface 204 with the camera body 100, and a connector 206 to connect the camera body 100.

As the recording medium 200, a memory card such as a PCMCIA card or Compact Flash®, or a hard disk is usable. A micro DAT, a magnetooptical disk, an optical disk such as a CD-R or CD-RW, or a phase-change optical disk such as a DVD may also be used.

The PC 210 includes a recording unit 212 formed from a magnetic disk (HD), an interface 214 with the camera body 100, and a connector 216 to connect the camera body 100. The interface 214 can be a USB, IEEE1394, or the like, but is not particularly limited.

Processing of eliminating, by image processing, the influence of dust on an optical member such as a low-pass filter or cover glass arranged in front of the image sensor of the image capturing apparatus having the above-described arrangement will be described next.

In the embodiment, a dust detection image for obtaining dust information (foreign substance information) representing the adhesion position, size, and the like of dust (foreign substance) is sensed, and dust data is extracted to generate dust data. The dust detection image is preferably obtained by sensing a surface having a uniform luminance as much as possible. However, the uniformity need not be strict because it is desirable to easily sense the image in a familiar place. For example, sensing a blue sky or white wall is assumed.

Figure 2:
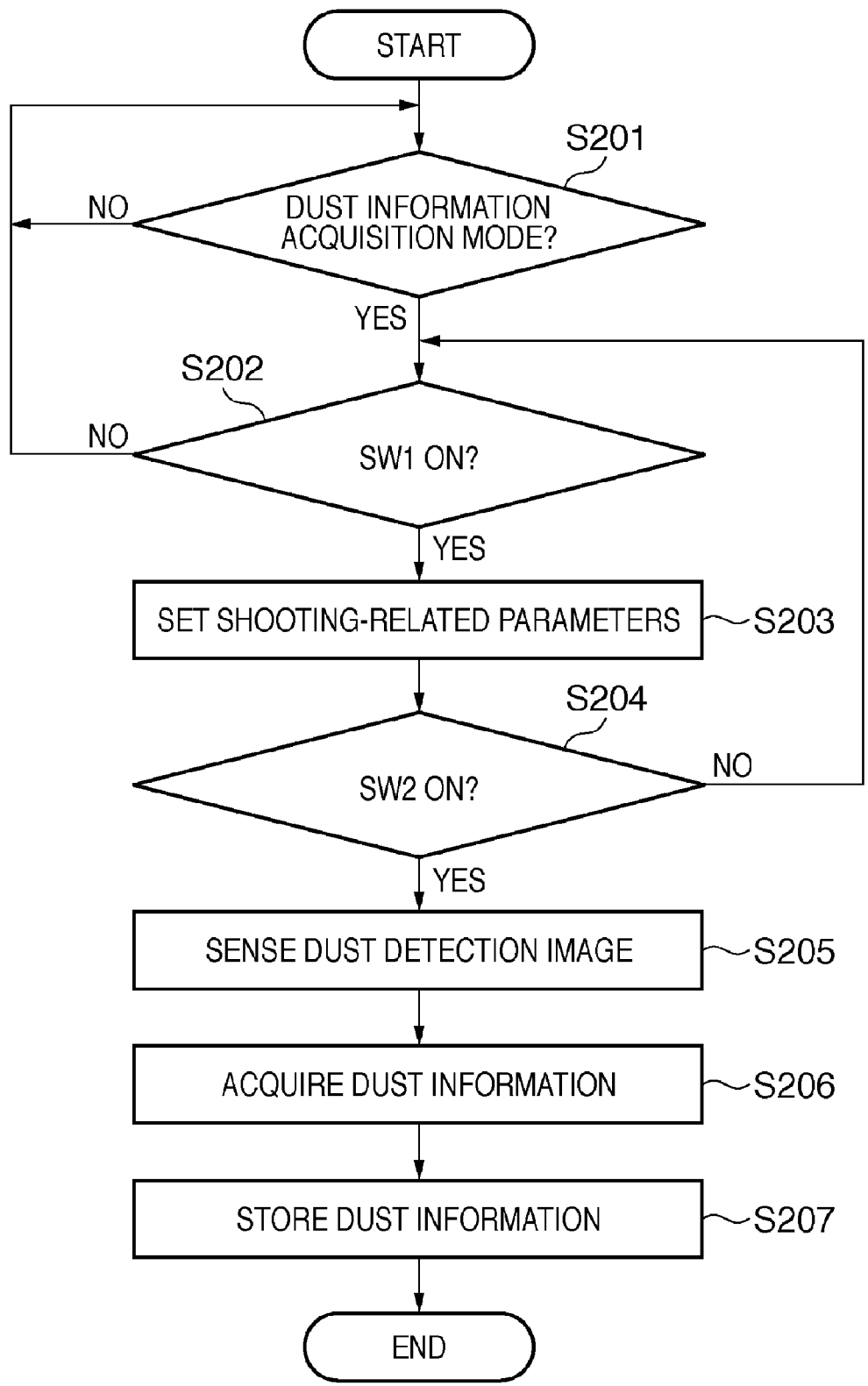
FIG. 2 is a flowchart showing processing in the image capturing apparatus (digital camera in the embodiment) when acquiring dust information in the embodiment of the present invention.

FIG. 2 is a flowchart showing processing of the image capturing apparatus (digital camera in the embodiment) when acquiring dust information in the embodiment.

First, in step S201, it is determined whether the operation unit 70 selects a dust information acquisition mode. The determination in step S201 is repeated until the dust information acquisition mode is selected. When the dust information acquisition mode is selected, the process advances to step S202 to determine whether the user has turned on the shutter switch SW1 62. If the shutter switch SW1 62 is OFF (NO in step S201), the process returns to step S201 to repeat the above-described processing.

Figures 3, 4:
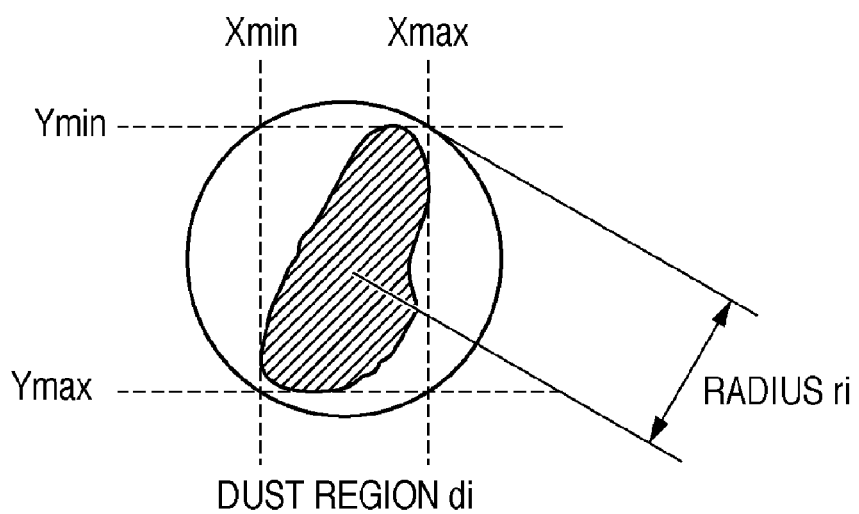
FIG. 3 is a table showing a list of setting parameters when acquiring dust information in the embodiment of the present invention.
FIG. 4 is a view showing an outline of dust region size calculation.

If the user has turned on the shutter switch SW1 62 (YES in step S201), the aperture value, ISO value, shutter speed, and other shooting-related parameters are set in step S203. FIG. 3 shows the parameters set here. The aperture value is set to, for example, F22 in a stopped-down-aperture state. Shooting may also be done using the minimum aperture within a range settable in the lens unit 300 connected to the lens mount 106. The aperture is stopped down because dust normally adheres to not the surface of the image sensor 14 but to the surface of a protective glass protecting the image sensor 14 or the surface of an optical filter placed not on the image sensor side but on the object side, and its imaging state changes depending on the aperture value of the lens unit 300. If the aperture is close to the full aperture, the dust image blurs, and it is impossible to acquire an appropriate dust detection image. For this reason, shooting is preferably done using the minimum aperture.

Referring back to the flowchart in FIG. 2, at this time, the user points the image capturing apparatus to a uniform luminance surface such as a wall as white as possible and operates the shutter switch SW2 64.

In step S204, it is determined whether the user has turned on the shutter switch SW2 64. If the shutter switch SW2 64 is OFF (NO in step S204), the process returns to step S202 to determine whether the shutter switch SW1 62 is ON or OFF. If the user has turned on the shutter switch SW2 64 (YES in step S204), the process advances to step S205. In step S205, the dust detection image (uniform luminance surface) is sensed, and the image data is stored in the memory 30. In step S206, dust information is acquired from the image data stored in the memory 30.

The acquisition of dust information will be described. More specifically, the position (coordinates) and size of each dust region are obtained from the sensed dust detection image. First, the region of the sensed dust detection image is divided into a plurality of blocks. A maximum luminance Lmax and average luminance Lave in each block are calculated. A threshold value T1 in each block is calculated by $$T1 = Lave \times 0.6 + Lmax \times 0.4$$

A dust-adhered pixel exhibits a lower luminance than that of its neighboring pixels. Thus, a pixel less than the threshold value T1 is determined as a dust pixel. Each isolated region formed from dust pixels is defined as a dust region di (i=0, 1, . . . , n).

FIG. 4 is a view showing an outline of dust region size calculation. As shown in FIG. 4, a maximum value Xmax and minimum value Xmin of the horizontal coordinates and a maximum value Ymax and a minimum value Ymin of the vertical coordinates of pixels included in a dust region are obtained. A radius ri representing the size of the dust region di is calculated by $$ri=[\sqrt{\{(X\text{max}-X\text{min})^2+(Y\text{max}-Y\text{min})^2\}}]/2$$

Central coordinates (Xdi,Ydi) are obtained approximately by $$Xdi=(X\text{max}+X\text{min})/2$$

$$Ydi=(Y\text{max}+Y\text{min})/2$$

The obtained position (coordinates) and radius are recorded as a dust information profile.

The size of dust correction data (dust information profile) is sometimes limited by the size of the nonvolatile memory 56 or the like. To cope with this case, pieces of dust position information are sorted by the size and the average luminance value of the dust region. In the embodiment, pieces of dust position information are sorted in the descending order of ri. When ri is the same, pieces of dust position information are sorted in the ascending order of the average luminance value.

With this setting, a conspicuous dust image can be preferentially registered in dust correction data. Note that Di represents a sorted dust region, and Ri represents the radius of the dust region Di.

When there is a dust region larger than a predetermined size, it may also be excluded from sorting targets and added to the end of a sorted dust region list. This is because, if a large dust region undergoes subsequent interpolation processing, it may degrade the image quality, and is desirably processed last.

The dust information profile has a structure shown in FIG. 5. As shown in FIG. 5, the dust information profile stores the lens information and the information of the position and size of dust upon sensing a dust detection image. More specifically, the actual aperture value (f-number) and the lens pupil position upon sensing a dust detection image are stored as the lens information upon sensing the dust detection image. Next, the number of detected dust regions (integer value) is stored in the storage area. Next to this value, the specific parameters of each dust region are stored repeatedly as many as the dust regions. The parameters of a dust region include a set of three numerical values: the radius of dust (e.g., 2 bytes), the x-coordinate of the center of an effective image area (e.g., 2 bytes), and the y-coordinate of the center (e.g., 2 bytes).

The obtained dust information is stored in the nonvolatile memory 56 in step S207, and the processing to acquire dust information ends.

The purpose of a shooting operation in the dust information acquisition mode is to acquire dust information. Thus, in the embodiment, a sensed image itself is neither compressed nor recorded on the recording medium 200 so as not to waste the capacity of the recording medium 200 by image data unnecessary for the user. However, an image sensed in the dust information acquisition mode may also be compressed and saved in the recording medium 200, similar to a normal image. At this time, the data can be arbitrarily modified by, for example, changing the extension.

The embodiment is directed to a method of correcting, by image processing, degradation of image quality caused by dust upon recording a moving image. Prior to a description of processing for a moving image, processing for a still image will be explained.

When a still image is obtained not by dust detection image shooting but by normal shooting, dust correction data (dust information profile) shown in FIG. 5 is recorded on the recording medium 200 in association with the image data together with camera set values and the like in normal shooting.

More specifically, dust information data can be associated with image data by adding the dust information data to, for example, an Exif region which is the header field of an image file where camera set values upon shooting are recorded. Alternatively, the dust information data is recorded as an independent file, and only link information to the dust information data file is recorded in image data, thereby associating the dust information and image data. However, if the image file and the dust information file are separately recorded, the link relationship may be lost upon moving the image file. To prevent this, the dust information is preferably held together with the image data.

Recording dust information data in association with to image data assumes a case where image data recorded together with dust correction data is moved to an external image processing apparatus and the external image processing apparatus executes dust removal processing.

Dust removal processing upon normal shooting using dust information stored in the nonvolatile memory 56 in the above-described way will be explained next with reference to the flowcharts of FIGS. 6 and 7. The following description concerns dust removal processing for a still image. However, the same dust removal processing as that for a still image can be similarly applied to a moving image by executing the processing for an image of every frame. The dust removal processing uses the dust removal circuit 31 in FIG. 1.

Figure 6:
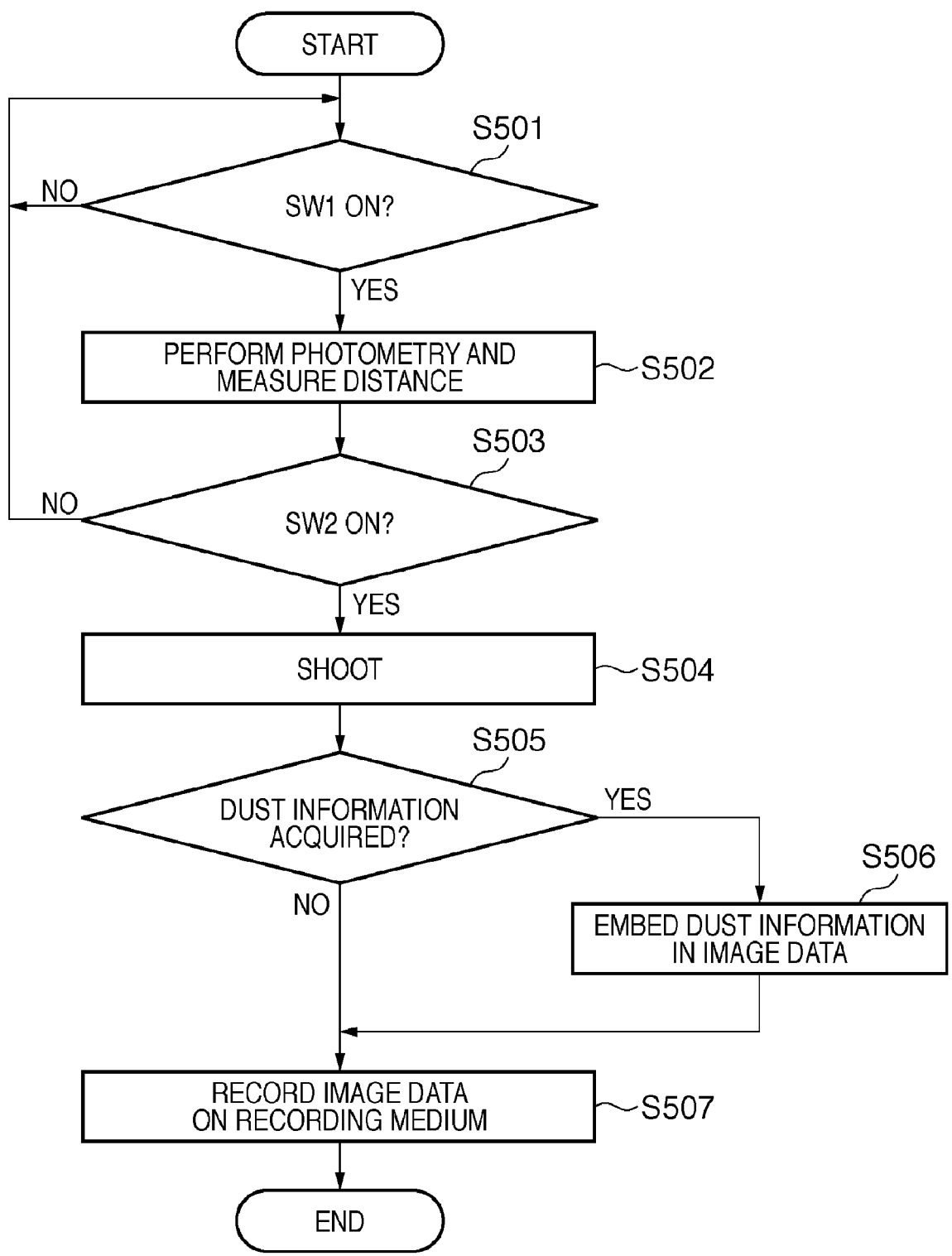
FIG. 6 is a flowchart showing still image shooting processing in normal shooting in the embodiment of the present invention.
Figure 7:
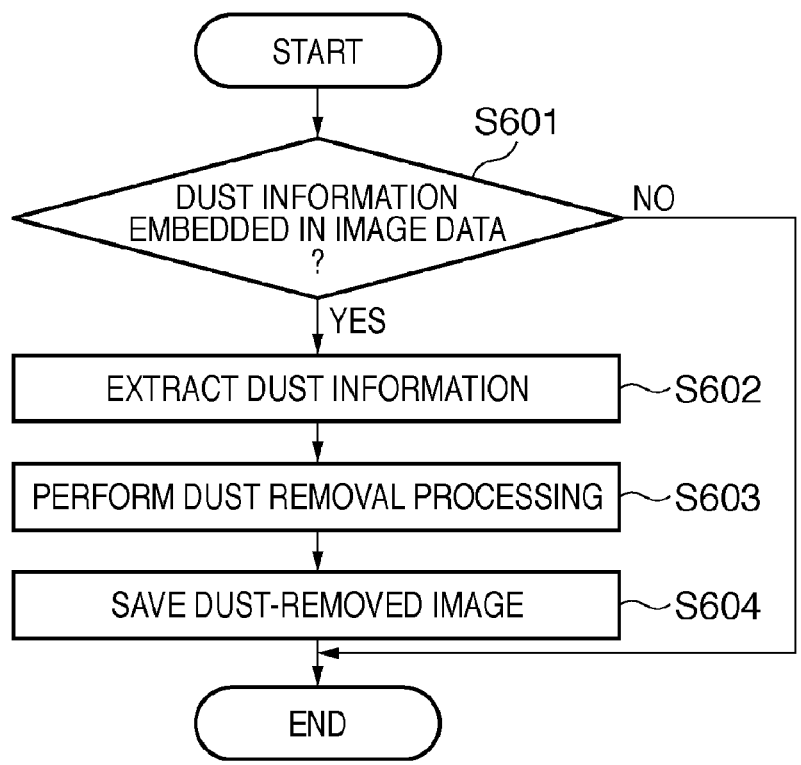
FIG. 7 is a flowchart showing the operation of dust removal processing.

FIG. 6 shows still image shooting processing in normal shooting in the embodiment.

In step S501, the process waits until the user turns on the shutter switch SW1 62. When the user turns on the shutter switch SW1 62 (YES in step S501), the process advances to step S502 to perform photometry processing and focus adjustment processing. Then, in step S503, it is determined whether the user has turned on the shutter switch SW2 64. If the shutter switch SW2 64 is OFF (NO in step S503), the process returns to step S501 to repeat the above-described processing. If it is detected that the user has turned on the shutter switch SW2 64 (YES in step S503), the process advances to step S504 to perform shooting. After the end of shooting, the process advances to step S505 to determine whether valid dust information exists in the nonvolatile memory 56. If dust information exists (YES in step S505), the process advances to step S506. If no dust information exists (NO in step S505), the process advances to step S507 to record the sensed image data on the recording medium 200.

In the embodiment, it is determined whether dust information exists in the nonvolatile memory 56. However, the necessary condition is whether shooting is done in the above-described dust information acquisition mode, so the determination method is not particularly limited. It is also possible to, for example, set a flag in shooting in the dust information acquisition mode and evaluate it.

In step S506, the acquired dust information is embedded in the header field (e.g., Exif region) of the sensed image data. In step S507, the dust information-embedded image data is recorded on the recording medium 200.

The operation of dust removal processing will be explained with reference to FIG. 7.

In step S601, it is determined whether dust information is embedded in a selected image. If dust information is embedded in a selected image (YES in step S601), the process advances to step S602 to extract the dust information. In step S603, correction processing such as pixel interpolation processing based on pixels around dust is executed in accordance with the extracted dust information so as to eliminate the influence of the dust from the image data.

A coordinate sequence Di (i=1, 2, . . . , n), a radius sequence Ri (i=1, 2, . . . , n), an aperture value f1, and a lens pupil position L1 are obtained from the extracted dust correction data. Ri represents the size of dust at the coordinates Di obtained upon sorting dust correction data. f1 represents the aperture value of the lens upon sensing a dust detection image, and L1 represents the pupil position of the lens similarly upon sensing a dust detection image. An aperture value f2 and lens pupil position L2 upon normally sensing an image are acquired, and Di is converted by the following equation. Converted coordinates Di' and a converted radius Ri' are defined by $$Di'(x,y)=(L2\times(L1-H)\times d/((L2-H)\times L1))\times Di(x,y)$$

$$Ri'=(Ri\times f1/f2+3) \quad (1)$$

where d is the distance from the image center to the coordinates Di, and H is the distance from the surface of the image sensor 14 to dust.

The unit is a pixel, and "+3" of Ri' means a margin.

Dust in a region defined by the coordinates Di' and converted radius Ri' is detected, and if necessary, interpolation processing is applied. Dust is detected again in this region because dust on the optical filter may move and be removed during the interval between dust detection image shooting and normal image shooting. If no dust exists, no interpolation processing need be done. Details of interpolation processing will be described later. Dust removal processing is applied to all coordinates, and if all coordinates have been processed, the process advances to step S604.

In step S604, an image having undergone correction processing to eliminate the influence of dust from the sensed image is newly recorded.

Then, the dust removal processing ends.

In the embodiment, the camera body 100 records dust information by embedding it in sensed image data, and correction processing is performed later to eliminate the influence of dust. To the contrary, it is also possible to, when sensing and recording an image by the camera body 100, perform correction processing of eliminating the influence of dust without embedding dust information, and record the corrected image on the recording medium 200. In correction processing for a moving image in the embodiment, the influence of dust is eliminated without embedding dust information in a moving image, and the corrected moving image is recorded on the recording medium 200, which will be described in detail later.

(Interpolation Processing)

Details of dust region interpolation processing will be explained.

Figure 8:
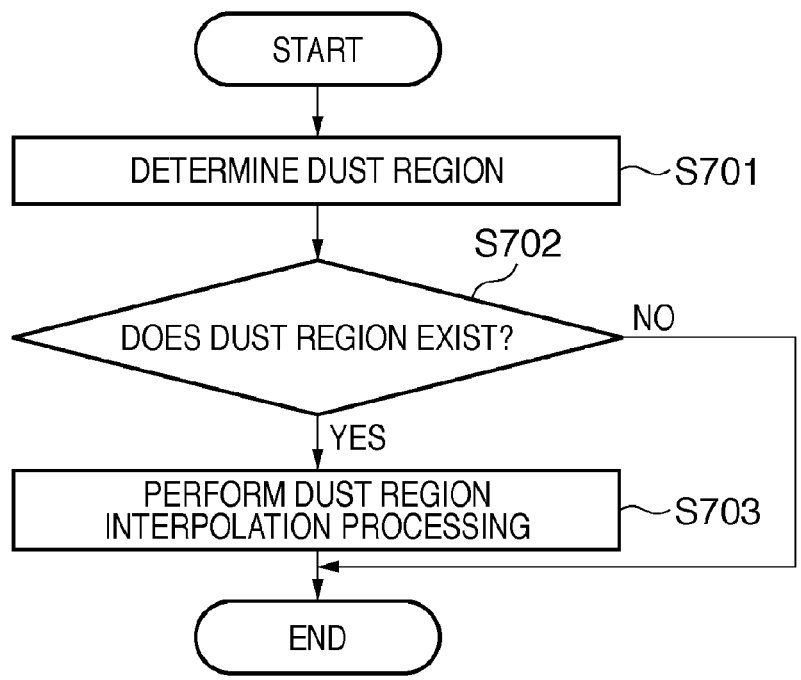
FIG. 8 is a flowchart showing the sequence of an interpolation routine.

FIG. 8 is a flowchart showing the sequence of an interpolation routine.

In step S701, a dust region is determined. The dust region is defined as a region which satisfies all the following conditions:

(1) a region which is darker than a threshold value T2 obtained using an average luminance Yave and maximum luminance Ymax of pixels falling in a region defined by the center coordinates Di' and radius Ri' (Ri' and Di' calculated by equation (1)):

$$T2=Yave\times 0.6+Ymax\times 0.4$$

(2) a region which does not contact a circle having the radius Ri' from the center coordinates Di'.

(3) a region whose radius value calculated by the above-described method is equal to or larger than 11 pixels and smaller than 12 pixels with respect to an isolated region of low-luminance pixels selected in (1).

(4) a region containing the center coordinates Di of the circle.

In the embodiment, 11 represents three pixels, and 12 represents 30 pixels. With this setting, only a small isolated region can be handled as a dust region. When no lens pupil position can be accurately acquired, condition (4) may also be eased. For example, when the region of interest contains the coordinates of a range of ±3 pixels from the coordinates Di in both the X and Y directions, it is determined as a dust region.

If such a region (portion) exists in an image signal in step S702 (YES in step S702), the process advances to step S703 to perform dust region interpolation. If no such region exists (NO in step S702), the process ends. The dust region interpolation processing executed in step S703 adopts a known defective region interpolation method. An example of the known defective region interpolation method is pattern replacement disclosed in Japanese Patent Laid-Open No. 2001-223894. In Japanese Patent Laid-Open No. 2001-223894, a defective region is specified using infrared light. In the embodiment, a dust region detected in step S701 is handled as a defective region, and interpolated by normal neighboring pixels by pattern replacement. For a pixel which cannot be interpolated by pattern replacement, p normal pixels are selected sequentially from one closest to the pixel to be interpolated in image data having undergone pattern correction, and the target pixel is interpolated using the average color of them.

In still image dust removal processing, dust correction data is attached to an image in this fashion. Thus, the correspondence between dust correction image data and sensed image data need not be considered. Since dust correction data is compact data formed from the position, size, and conversion data (aperture value and distance information of the lens pupil position), the size of sensed image data does not extremely increase. By interpolating only a region containing pixels designated by dust correction data, the probability of a detection error can greatly decrease.

Dust correction processing in moving image recording in the image capturing apparatus having the image processing function in the embodiment will be explained.

Figure 9:
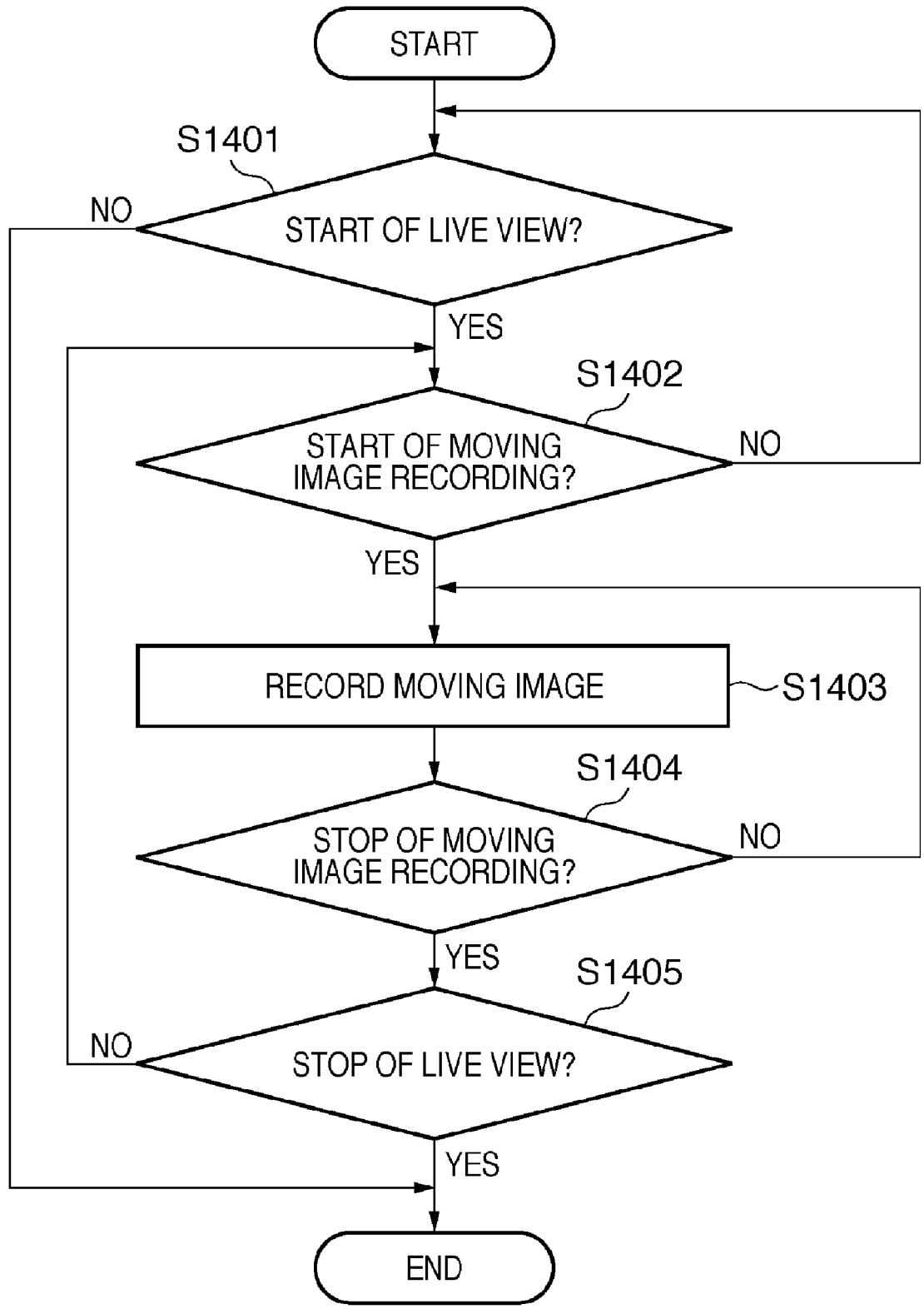
FIG. 9 is a flowchart for explaining an operation in moving image recording.

FIG. 9 is a flowchart for explaining an operation in moving image recording.

In step S1401, it is determined whether the user has selected the start of live view from the operation unit 70. The determination in step S1401 is repeated until the user selects the start of live view. When the user selects the start of live view (YES in step S1401), the mirror 130 flips up, the shutter 12 is opened, and an optical image is formed on the image sensor 14.

An analog signal output from the image sensor 14 at a predetermined frame rate is converted into a digital signal by the A/D converter 16. The digital signal undergoes predetermined pixel interpolation processing and color conversion processing by the image processing circuit 20, and is stored in a frame memory buffer in the memory 30.

At this time, the camera body 100 requests various kinds of optical information (aperture value, zoom position, pupil distance, focal length, and the like) of the lens unit 300 in accordance with the frame rate. Various kinds of optical information sent from the lens unit 300 via the connector 122 are stored in the optical information memory 58 in correspondence with each image data in the frame memory buffer.

The image data stored in the frame memory buffer is read out again, converted into display image data by the image processing circuit 20, and stored in the image display memory 24. The display image data written in the image display memory 24 is displayed on the image display unit 28 via the D/A converter 26. Accordingly, the image display unit 28 changes to the live view display (electronic viewfinder operation).

In step S1402, it is determined whether the user has selected the start of moving image recording from the operation unit 70. If the user has not selected the start of moving image recording (NO in step S1402), the process returns to step S1401 to repeat the above-described processing. If the user has selected the start of moving image recording (YES in step S1402), the process advances to S1403 to start recoding a moving image.

After the start of moving image recoding, the image data stored in the frame memory buffer is sent to the dust removal circuit 31 and undergoes dust removal processing. The dust removal processing is performed similarly to that for a still image except that it is executed for each frame using dust correction data (dust information) stored in the nonvolatile memory 56, instead of dust correction data recorded on the recording medium 200 in association with image data. The dust-removed image data is encoded by the compression/decompression circuit 32, and temporarily saved in an encoded moving image data buffer in the memory 30.

After the start of moving image recoding, audio data input from a microphone (not shown) is encoded by the audio signal processing circuit, and the encoded audio data is temporarily saved in an encoded audio data buffer in the memory 30. The amounts of temporarily saved encoded moving image data and encoded audio data increase upon the lapse of time. Thus, temporarily saved encoded moving image data and encoded audio data are converted into a predetermined file format, and written in the recording medium 200 via the interface 90 at a proper timing.

In step S1404, it is determined whether the user has selected the stop of moving image recording from the operation unit 70. If the user has not selected the stop of moving image recording (NO in step S1404), the process returns to step S1403 to continue moving image recording. If the user has selected the stop of moving image recording (YES in step S1404), the process advances to step S1405 to determine whether he has selected the stop of the live view operation. If the user has not selected the stop of the live view operation (NO in step S1405), the process returns to step S1402 and waits for the next moving image recording. If the user has selected the stop of the live view operation (YES in step S1405), the moving image recording routine ends.

During moving image recording (live view), image data is written in the frame memory buffer at a predetermined frame rate, and thus encoding processing needs to be done to prevent the frame memory buffer from becoming full. However, the number of dust images to be removed by the dust removal circuit 31 changes depending on the number and size of dust images included in dust information, and optical information acquired from the lens unit 300. For this reason, the dust removal time during moving image recording is not constant.

Moving image compression encoding processing executed after dust removal processing requires a different processing time depending on the spatial frequency of an object image and the magnitude of motion. Even the difference in processing time also influences the free area of the buffer memory.

Figure 10:
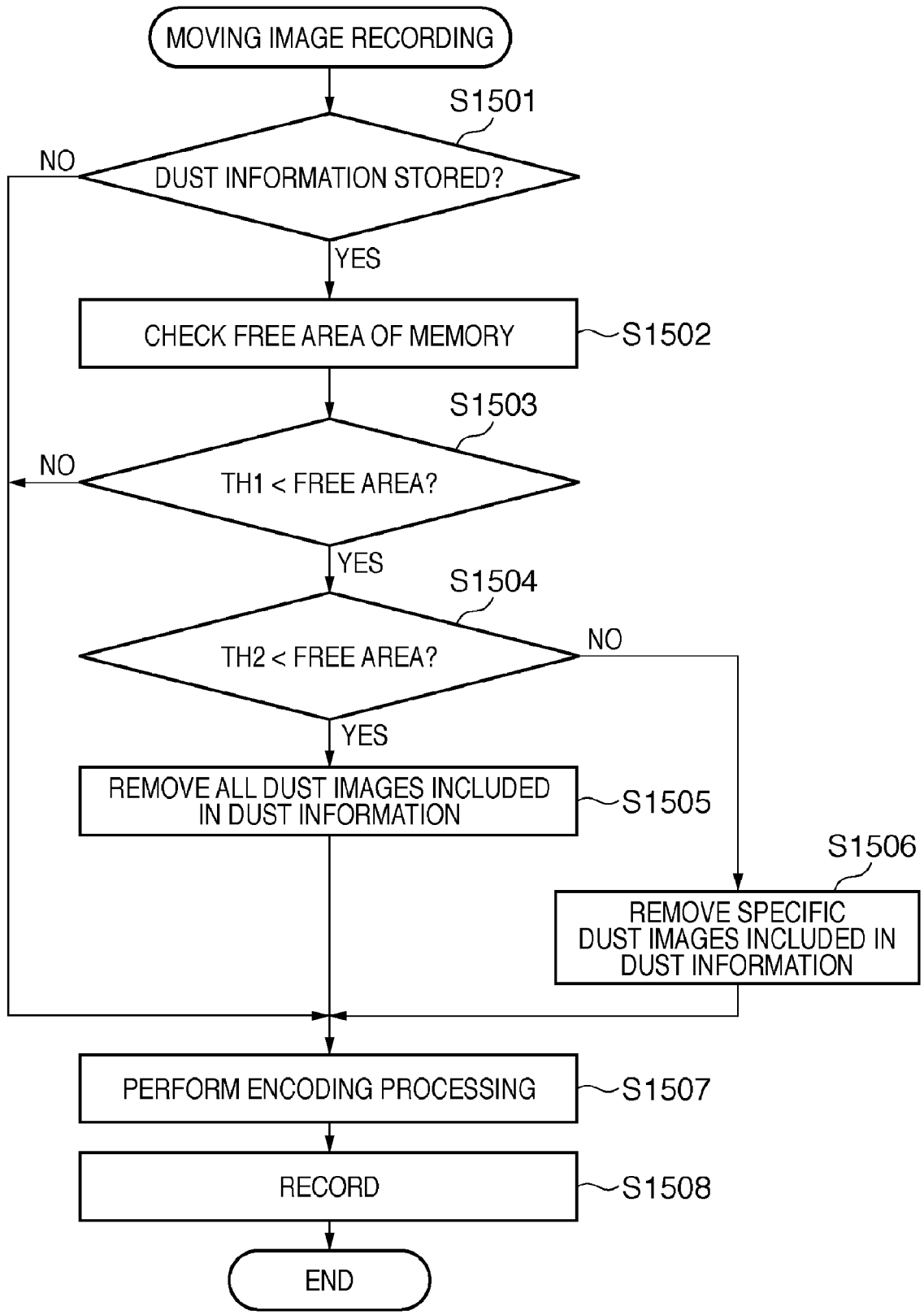
FIG. 10 is a flowchart for explaining an operation to change the contents of dust removal processing in accordance with the free area of a frame memory buffer.

FIG. 10 is a flowchart for explaining an operation to change the contents of dust removal processing in accordance with the free area of the frame memory buffer so as to prevent the frame memory buffer from becoming full.

After the start of moving image recording, it is checked in step S1501 whether dust information is stored in the nonvolatile memory 56 in accordance with the above-described operation. If no dust information is stored in the nonvolatile memory 56 (NO in step S1501), no dust position can be specified, and image data stored in the frame memory buffer is sent not to the dust removal circuit 31, but to the compression/decompression circuit 32. If dust information is stored in the nonvolatile memory 56 (YES in step S1501), the process advances to step S1502 to check the free area of the frame memory buffer.

In the embodiment, two threshold levels, that is, a threshold level TH1 (first threshold level) and threshold level TH2 (second threshold level) are set for the free area of the frame memory buffer. The threshold levels TH1 and TH2 satisfy a relation: TH1<TH2, which means that the free area of the frame memory buffer is smaller for the threshold level TH1.

The amount of image data written in the frame memory buffer in a predetermined unit time is uniquely determined by the image size and frame rate. Thus, the threshold levels TH1 and TH2 are desirably determined in consideration of the amount of written data and the time taken for dust removal.

In step S1503, the free area of the frame memory buffer is compared with the threshold level TH1. If the free area of the frame memory buffer is larger than the threshold level TH1 (YES in step S1503), the process advances to step S1504. If the free area of the frame memory buffer is equal to or smaller than the threshold level TH1 (NO in step S1503), the frame memory buffer may become full, so the image data is sent not to the dust removal circuit 31 but to the compression/decompression circuit 32, and encoded.

If the free area of the frame memory buffer decreases and the buffer becomes full, the frame rate of moving image recording must be decreased or moving image recording must be stopped, impairing user friendliness of moving image recording. In the image processing apparatus according to the embodiment, when the free area of the frame memory buffer is equal to or smaller than the threshold level TH1 (first threshold level), it is controlled to encode image data stored in the frame memory buffer as early as possible without executing dust removal processing, so as to prevent the frame memory buffer from becoming full.

In step S1504, the free area of the frame memory buffer is compared with the threshold level TH2. If the free area of the frame memory buffer is larger than the threshold level TH2 (YES in step S1504), it is determined that the frame memory buffer has a sufficient free area. Then, the process advances to step S1505 to perform dust removal processing for all dust images included in dust information. If the free area of the frame memory buffer is equal to or smaller than the threshold level TH2 (second threshold level) (NO in step S1504), the process advances to step S1506 to perform dust removal processing for specific dust images in dust information.

In step S1505, the dust removal circuit 31 performs dust removal processing for all dust images included in dust information. The dust removal circuit 31 receives image data stored in the frame memory buffer, dust information stored in the nonvolatile memory 56, and optical information which is stored in the optical information memory 58 and corresponds to the image data. The dust removal circuit 31 removes dust images from image data according to the same dust removal method as the above-described one for a still image, and writes back the dust-removed image data in the frame memory buffer.

Figure 11:
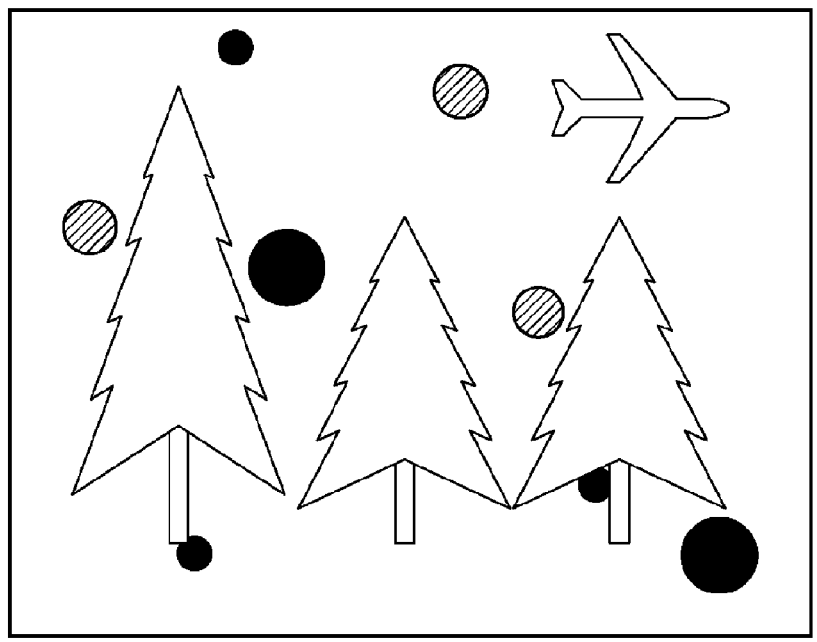
FIG. 11 is a view showing an example of image data input to a dust removal circuit.
Figure 12:
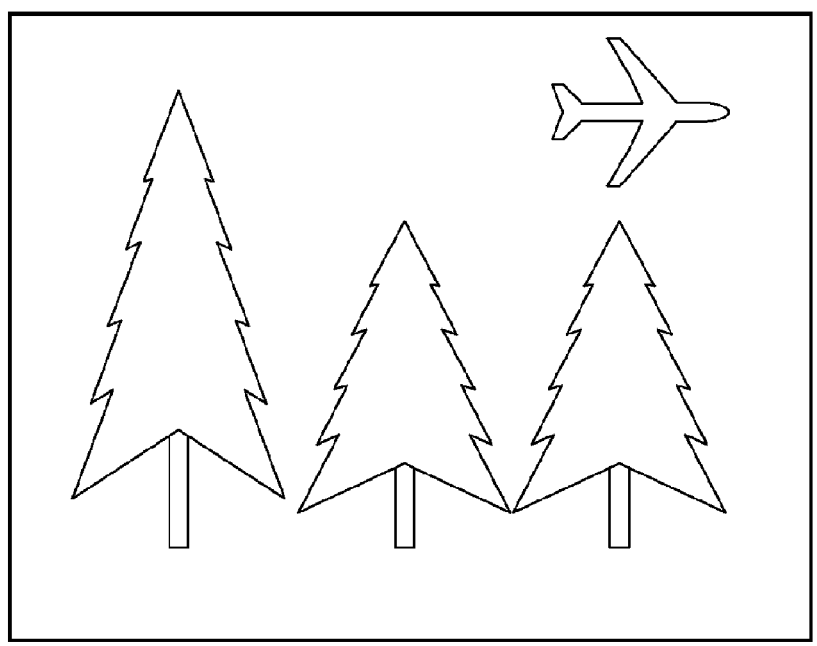
FIG. 12 is a view for explaining image data from which all dust images included in dust information are removed.

FIG. 11 is a view showing an example of image data input to the dust removal circuit 31. In step S1505, dust removal is done for all dust images included in dust information, obtaining dust-removed image data as shown in FIG. 12.

Figure 13:
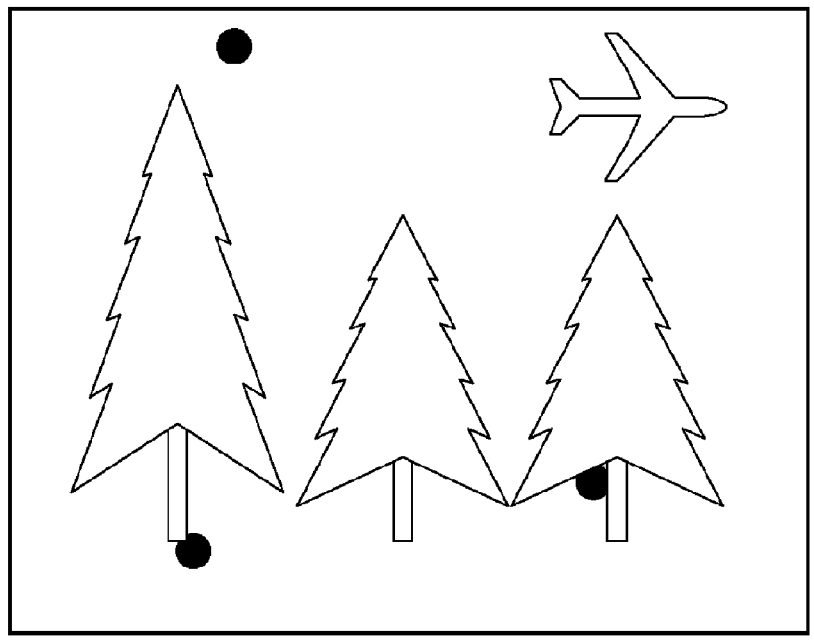
FIG. 13 is a view for explaining image data from which large dust images included in dust information are removed.

In step S1506, dust removal processing is performed for specific dust images which are included in dust information and stand out in the frame. Similar to step S1505, the dust removal circuit 31 receives image data stored in the frame memory buffer, dust information stored in the nonvolatile memory 56, and optical information which is stored in the optical information memory 58 and corresponds to the image data. The dust removal circuit 31 executes dust removal processing for, for example, dust images larger than a predetermined size, obtaining dust-removed image data as shown in FIG. 13. After that, the dust removal circuit 31 writes back the dust-removed image data in the frame memory buffer. More specifically, dust correction data are sorted by the dust size. Dust images are removed sequentially from the largest one, and the processing ends at a dust image whose radius Ri' after conversion equals two pixels. In this case, a dust image whose radius Ri' is larger than two pixels is defined as a specific dust image which is conspicuous in the frame. However, the size may also be changed in accordance with the number of pixels per frame of an output moving image, and the output device.

As another definition, the number of processes may also be linearly decreased in accordance with the free area of the frame memory buffer such that all dust images are processed at the threshold level TH2 and none of them is processed at the threshold level TH1.

In the image processing apparatus according to the embodiment, when the free area of the frame memory buffer is larger than the threshold level TH1 and equal to or smaller than the threshold level TH2, dust images to be removed are limited to those which stand out in the frame, thereby shortening the dust removal processing time. It is controlled to encode image data stored in the frame memory buffer as early as possible so as to prevent the frame memory buffer from becoming full.

The condition to determine a dust image subjected to dust removal processing in step S1506 is not limited to the size. As another example, the density of a captured dust image, or the position of dust (dust image near the center is preferentially removed) may also be adopted, or these conditions may also be combined. These conditions may also be changed in accordance with an actual free area of the frame memory buffer. More specifically, when the density of a captured dust image is adopted, a luminance value at the center coordinates of a dust image described in dust correction data is read and compared with a luminance value serving as a predetermined threshold level, and if the luminance value is equal to or smaller than the threshold level, the dust image undergoes dust removal processing. This condition is based on the idea that a higher-density image stands out more and thus preferentially removed. When the dust position is adopted, the center coordinates of a dust image described in dust correction data are read, it is determined whether the read center coordinates fall within a predetermined center region of an image, and if so, the dust image is removed. This condition is based on the idea that a dust image closer to the center of the frame stands out more and thus is preferentially removed.

Figure 14:
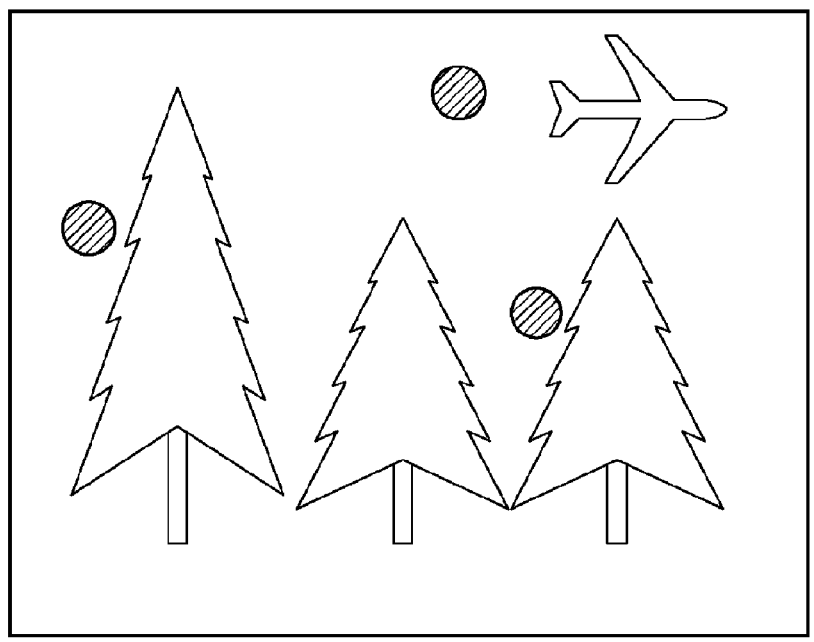
FIG. 14 is a view for explaining image data from which high-density dust images included in dust information are removed.

FIG. 14 shows image data after dust removal when performing dust removal processing for a dust image which is included in dust information and has a density higher than a predetermined one.

Referring back to the flowchart in FIG. 10, in step S1507, the compression/decompression circuit 32 encodes image data stored in the frame memory buffer. The encoding processing may also be the above-mentioned Motion JPEG or H.264, or another encoding processing method. The encoded moving image data is stored in the encoded moving image data buffer in the memory 30, and converted into a predetermined file format together with encoded audio data similarly stored in the encoded audio data buffer in the memory 30. In step S1508, the data of the predetermined file format is written in the recording medium 200 via the interface 90.

Figure 15:
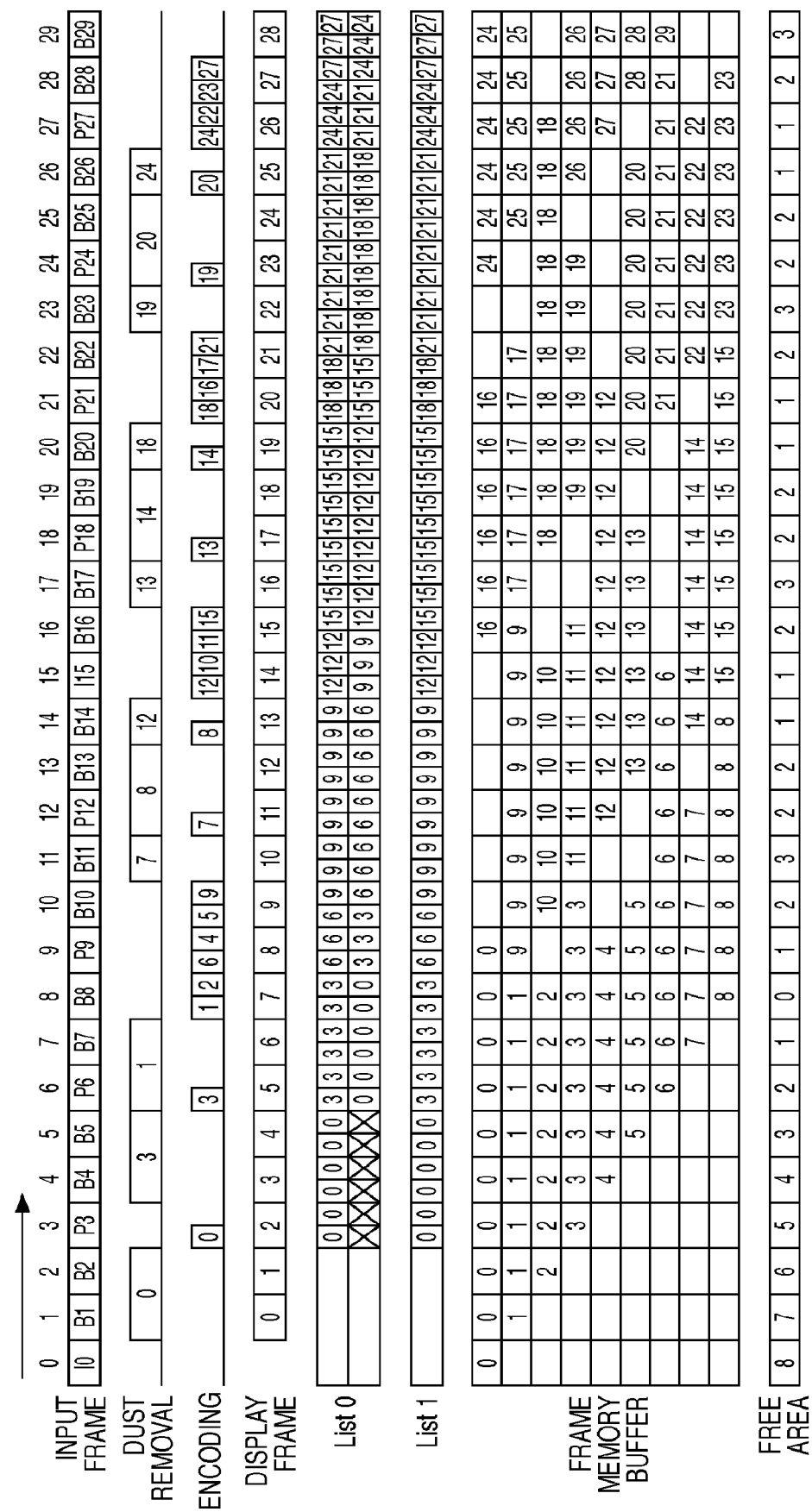
FIG. 15 is a view for explaining the operation of the frame memory buffer.

FIG. 15 is a view showing an example of the frame memory buffer upon H.264 encoding.

The timings of the input frame memory, dust removal processing, encoding processing, and display frame processing are shown from the top. Further, List0 and List1 used for encoding, the state of the frame memory buffer, and the free area of the frame memory buffer are shown for each input frame unit time.

In the embodiment, the reference list List0 holds two pictures, and the reference list List1 holds one picture. I- or P-pictures are registered in the reference list.

For descriptive convenience, the time of each processing is set as follows. The encoding processing time is half the time taken to write image data of one frame in the frame memory buffer. The processing time taken for dust removal originally changes for each frame depending on the contents of optical information corresponding to each frame. However, assuming that no optical parameter changes during moving image recording, the processing time taken to remove all dust images is two frames. When the free area of the frame memory buffer is equal to or smaller than TH2 and only specific dust images are removed, the time taken for dust removal processing is one frame.

The frame memory buffer ensures a capacity of nine frames, and input frames are sequentially written. A frame to be deleted from the frame memory buffer is one which has been encoded and is registered in neither the reference list List0 nor List1.

In the embodiment, a determination threshold level used to change the contents of dust removal processing in accordance with the free area of the frame memory buffer is set as follows. More specifically, the threshold level TH1 used when no dust removal processing is performed is TH1=1, and the threshold level TH2 used to determine whether to perform dust removal processing for only specific dust images (conspicuous dust images in the embodiment) included in dust information is TH2=2.

When image data are input sequentially from an input frame I0 (I-picture), they are written from the start of the frame memory buffer. In FIG. 15, prefixes I, P, and B are added to frame numbers (0, 1, 2, 3, . . . ) to represent I-, P-, and B-pictures in the input frame memory. However, only frame numbers are described in the remaining parts.

When the input frame I0 is written in the frame memory buffer, the free area of the frame memory buffer becomes "8". At the timing when the next input frame B1 is input, the free area of the frame memory buffer is compared with the threshold levels TH1 and TH2 to determine the contents of dust removal processing. When dust removal processing has already been done, the process waits for the timing of the next input frame without performing the comparison processing. Since the free area of the frame memory buffer is "8", $$(TH2=2)<(\text{free area}=8)$$

For the input frame I0, it is determined to remove all dust images. To remove all dust images, the dust removal circuit 31 executes dust removal processing in the 2-frame processing time. Parallel to this, input frames B1 and B2 are input to the input frame memory. At the end of the dust removal processing, at the timing when an input frame P3 is input to the input frame memory, encoding processing for the input frame I0 starts. The encoding processing is completed within the 0.5-frame period, as described above. In synchronism with the timing of encoding processing, the input frame I0 is registered in the reference list. In the embodiment, the reference list and frame memory buffer use the same memory area. However, another memory area may also be prepared as the reference list area.

Frames input subsequently to the input frame I0 are the input frames B1 and B2, which are B-pictures. The process suspends until the frame of an I- or P-picture is input later.

Subsequently to the input frame B2, the input frame P3 is input to the input frame memory. At this time, the free area of the frame memory buffer is "5", (TH2=2)<(free area=5)

For the input frame P3, it is determined to remove all dust images. Similar to the input frame I0, the dust removal circuit 31 removes all dust images in the 2-frame processing time. Parallel to this, input frames B4 and B5 are input to the input frame memory. At the end of the dust removal processing, at the timing when an input frame P6 is input to the input frame memory, encoding processing for the input frame P3 starts. In synchronism with the timing of encoding processing, the input frame P3 is registered in the reference list.

At this time, the I-picture (input frame I0) and the P-picture (input frame P3) are obtained before and after the input frames B1 and B2 which are bidirectionally predictive B-pictures. Thus, processing for the input frame B1 becomes possible.

Immediately before dust removal processing for the input frame P3 is completed, the free area of the frame memory buffer is "3", (TH2=2)<(free area=3)

Even for the input frame B1 for which processing becomes possible for the first time, it is determined to remove all dust images. Similar to the input frame I0, the dust removal circuit 31 removes all dust images in the 2-frame processing time. Parallel to this, input frames P6 and P7 are input to the input frame memory. At the end of the dust removal processing, at the timing when an input frame B8 is input to the input frame memory, encoding processing for the input frame B1 starts. Since the input frame B1 is a B-picture, it is neither referred to by another frame nor registered in the reference list.

In this manner, dust removal processing and encoding processing proceed. When an input frame B7 is input while executing dust removal for the input frame B1, the free area of the frame memory buffer becomes "1" and becomes equal to or smaller than the threshold level TH1:

(TH1=1)≧(free area=1)

For the input frame B2 which is to undergo dust removal processing next, it is determined not to perform dust removal processing. Immediately after encoding processing for the input frame B1, encoding processing is executed for the input frame B2.

At the timing when the next frame "B8" is input, the free area of the frame memory buffer becomes "0" and becomes smaller than the threshold level TH1:

(TH1=1)>(free area=0)

As described above, the frame of a B-picture is processed after processing an I- or P-picture before or after the B-picture. Hence, the input frames B4 and B5 are held until the input frame P6 is processed. After the end of processing the input frame B2, the input frame P6 is processed next.

However, at the timing to process the input frame P6, the free area of the frame memory buffer is "0", as described above. Thus, it is determined not to perform dust removal processing, and no dust removal processing is done. Immediately after encoding processing for the input frame B2, encoding processing is executed for the input frame P6 without performing dust removal processing.

Since the input frame P6 is a P-picture, it is registered in the reference list in synchronism with the timing of encoding processing. At this time, encoding processing for the input frames B1 and B2 which are B-pictures sandwiched between the input frames I0 and P3 has been completed, so the input frame I0 is no longer be referred to. Hence, the input frame P6 is registered in the reference list instead of the input frame I0.

Simultaneously when encoding processing is done for the input frame P6, the input frames B1 and B2 need not be left in the frame memory buffer and thus are deleted. The timing to perform encoding processing for the input frame P6 is the timing when an input frame P9 is input to the input frame memory. This frame is written in an area where the input frame B1 deleted from the frame memory buffer has been written. At this time (timing when the input frame P9 is input), the free area of the frame memory buffer becomes "1".

Since the time necessary for encoding processing is a 0.5 frame, the timing when encoding processing for the input frame P6 is completed does not coincide with the timing when a frame is input to the input frame memory. For this reason, determination of whether dust removal processing is possible suspends, and encoding processing is executed without performing dust removal processing for the input frame B4 to be processed next.

After that, the input frames B5 and P9 are processed. At the timing to start processing the input frame B5, the input frame I0 has already been erased from the reference list, and thus is also erased from the frame memory buffer. At this time, encoding processing for the input frame B4 has also been completed, and the input frame B4 is also erased from the frame memory buffer. At the timing to start processing the input frame B5, an input frame B10 is input to the frame memory buffer. The free area becomes "1" immediately before processing the input frame B5, and "2" immediately after processing the input frame B5.

Since the free area immediately before processing the input frame B5 is "1", the input frames B5 and P9 directly undergo encoding processing without dust removal processing. Since the input frame P9 is a P-picture, it is registered in the reference list instead of the input frame P3.

The input frame B7 is to be processed next to the input frame P9. At the timing to start the processing, the free area of the frame memory buffer becomes "2", as described above.

Since the free area of the frame memory buffer is larger than the threshold level TH1 and equal to or smaller than the threshold level TH2, it is determined to remove only a conspicuous dust image (large dust image) from the input frame B7:

(TH1=1)<(free area=2)

(TH2=2)≧(free area=2)

At the timing when an input frame B11 is input simultaneously when dust removal processing for the input frame B7 starts, the processed input frames P3 and B5 are erased from the frame memory buffer, and the input frame B11 is newly written. As a result, the free area of the frame memory buffer becomes "3".

Dust removal processing for the input frame B7 to remove only a large dust image is completed within a 1-frame period. The free area immediately before processing the next input frame B8 becomes "3". Since the free area of the frame memory buffer becomes larger than the threshold level TH2, it is determined to remove all dust images included in dust information from the input frame B8:

(*TH2*=2)<(free area=3)

Thereafter, the contents of dust removal processing are sequentially determined in the above-described way in accordance with the free area of the frame memory buffer during moving image recording. Dust removal processing and encoding processing are repeated.

The number of images which can be stored in the frame memory buffer, the number of frames which can be registered in the reference list, and the values of the threshold levels TH1 and TH2 and the like in the embodiment are merely examples, and can be arbitrarily set in accordance with the performance of the image processing apparatus, the capacity of memory installed, and the like. The time necessary to remove all dust images is two frames, the time necessary to remove specific dust images is one frame, and these times have been explained together with the timings of input frames. However, the processing times are not limited to them. In practice, the processing times change depending on the size of dust, the number of dust images, the density, and the like, and are often not synchronized with the timings of frame inputs. In this case, the free area of the frame memory buffer at an arbitrary timing to start dust removal processing may also be checked to determine the contents of dust removal processing.

In the embodiment, the frame of an I-picture is arranged at the start of every 15 frames, those of P-pictures are arranged every third frames, those of B-pictures are interposed between I- and B pictures, and this structure is repeated. However, the frame structure is not limited to this. For example, frames may also be formed from only I- and P-pictures without using B-pictures. In this case, encoding processing proceeds in the order of input frames, which facilitates management of frames.

As described above, according to the embodiment, the contents of dust removal processing change in accordance with the free area of the frame memory buffer:

(1) all dust images included in dust information are removed.

(2) specific dust images in the frame among dust images included in dust information are removed.

(3) no dust image is removed.

Accordingly, moving image recording and dust removal processing can be simultaneously executed without decreasing the frame rate during moving image recording or suspending moving image recording.

OTHER EMBODIMENTS

The objects of the embodiment are also achieved by the following method. A storage medium (or recording medium) which stores software program codes to implement the functions of the above-described embodiment is supplied to a system or apparatus. The computer (or CPU or MPU) of the system or apparatus reads out and executes the program codes stored in the storage medium. In this case, the program codes read out from the storage medium implement the functions of the above-described embodiment. The storage medium that stores the program codes constitutes the present invention. The functions of the above-described embodiment are implemented not only by causing the computer to execute the readout program codes. The present invention also includes a case where the operating system (OS) or the like running on the computer executes part or all of actual processing on the basis of the instructions of the program codes, thereby implementing the functions of the above-described embodiment.

The present invention also incorporates the following case. More specifically, the program codes read out from the storage medium are written in the memory of a function expansion card inserted into the computer or the memory of a function expansion unit connected to the computer. The CPU of the function expansion card or function expansion unit executes part or all of actual processing on the basis of the instructions of the program codes, thereby implementing the functions of the above-described embodiment.

The storage medium to which the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-043550, filed Feb. 25, 2008 which is hereby incorporated by reference herein in its entirety.

What is claimed is:

1. An image capturing apparatus comprising:
   an image capturing unit which has an image sensor for photoelectrically converting an object image, and generates an image signal on the basis of an output signal from the image sensor;
   a storage unit which stores foreign substance information including information on at least a position and size of a foreign substance adhering to an optical element arranged in front of the image sensor;
   a buffer unit which temporarily stores the image signal output from said image capturing unit;
   a correction unit which corrects, based on the foreign substance information, an image signal corresponding to a shadow of the foreign substance among image signals output from said buffer unit and outputs a corrected image signal; and
   a control unit which controls said buffer unit and said correction unit to change, in accordance with a free area of said buffer unit, an amount of the image signal corresponding to the shadow of the foreign substance that is to be corrected among image signals output from said image capturing unit.

2. The apparatus according to claim 1, wherein when the free area of said buffer unit becomes not larger than a first threshold level, said control unit controls said buffer unit and said correction unit not to correct the image signal corresponding to the shadow of the foreign substance.

3. The apparatus according to claim 2, wherein when the free area of said buffer unit becomes larger than the first threshold level and not larger than a second threshold level which is larger than the first threshold level, said control unit controls said buffer unit and said correction unit to correct an image signal corresponding to a shadow of a foreign substance having a size larger than a predetermined size among foreign substances included in the foreign substance information.

4. The apparatus according to claim 2, wherein when the free area of said buffer unit becomes larger than the first threshold level and not larger than a second threshold level which is larger than the first threshold level, said control unit controls said buffer unit and said correction unit to correct an image signal corresponding to a shadow of a foreign substance having a density higher than a predetermined density among foreign substances included in the foreign substance information.

5. The apparatus according to claim 2, wherein when the free area of said buffer unit becomes larger than the first threshold level and not larger than a second threshold level which is larger than the first threshold level, said control unit controls said buffer unit and said correction unit to correct an image signal corresponding to a shadow of a foreign substance near a center of an image among foreign substances included in the foreign substance information.

6. The apparatus according to claim 2, wherein when the free area of said buffer unit becomes larger than a second threshold level which is larger than the first threshold level, said control unit controls said buffer unit and said correction unit to correct image signals corresponding to shadows of all foreign substances included in the foreign substance information.

7. A method of controlling an image capturing apparatus including an image capturing unit which has an image sensor for photoelectrically converting an object image, and generates an image signal on the basis of an output signal from the image sensor, a storage unit which stores foreign substance information including information on at least a position and size of a foreign substance adhering to an optical element arranged in front of the image sensor, a buffer unit which temporarily stores the image signal output from the image capturing unit, and a correction unit which corrects, based on the foreign substance information, an image signal corresponding to a shadow of the foreign substance among image signals output from the buffer unit and outputs a corrected image signal, the method comprising:

a control step of controlling the buffer unit and the correction unit to change, in accordance with a free area of the buffer unit, an amount of the image signal corresponding to the shadow of the foreign substance that is to be corrected among image signals output from the image capturing unit.

8. A non-transitory computer-readable medium storing a program causing a computer to execute a control method defined in claim 7.

* * * * *